(12) United States Patent
Shim et al.

(10) Patent No.: US 12,406,483 B2
(45) Date of Patent: Sep. 2, 2025

(54) ONLINE CLASS-INCREMENTAL CONTINUAL LEARNING WITH ADVERSARIAL SHAPLEY VALUE

(71) Applicants: LG ELECTRONICS INC., Seoul (KR); The Governing Council of the University of Toronto, Toronto (CA)

(72) Inventors: Dongsub Shim, North York (CA); Zheda Mai, Toronto (CA); Jihwan Jeong, Toronto (CA); Scott Sanner, Scarborough, ME (US); Hyunwoo Kim, Incheon (KR); Jongseong Jang, Hanam-si (KR)

(73) Assignees: LG ELECTRONICS INC., Seoul (KR); THE GOVERNING COUNCIL OF THE UNIVERSITY OF TORONTO CANADA, Toronto (CA)

( * ) Notice: Subject to any disclaimer, the term of this patent is extended or adjusted under 35 U.S.C. 154(b) by 1055 days.

(21) Appl. No.: 17/331,332

(22) Filed: May 26, 2021

(65) Prior Publication Data
US 2021/0383158 A1    Dec. 9, 2021

Related U.S. Application Data

(60) Provisional application No. 63/030,268, filed on May 26, 2020.

(51) Int. Cl.
*G06N 3/08* (2023.01)
*G06F 18/21* (2023.01)
(Continued)

(52) U.S. Cl.
CPC .......... *G06V 10/82* (2022.01); *G06F 18/2113* (2023.01); *G06F 18/217* (2023.01);
(Continued)

(58) Field of Classification Search
CPC ........ G06V 10/82; G06V 10/764; G06N 3/08; G06F 18/2431
See application file for complete search history.

(56) References Cited

U.S. PATENT DOCUMENTS

| 2016/0279444 | A1* | 9/2016 | Schlosser | A61N 5/1049 |
| 2020/0340909 | A1* | 10/2020 | Ohsaka | G01N 15/1433 |
| 2020/0410588 | A1* | 12/2020 | Bax | G06Q 40/08 |

OTHER PUBLICATIONS

Chaudhry, et al., "On Tiny Episodic Memories in Continual Learning" [online], arXiv: 1902.10486v4 [cs.LG], Feb. 27, 2019, 15 pages.

(Continued)

*Primary Examiner* — Ashish Thomas
*Assistant Examiner* — Evel Honore
(74) *Attorney, Agent, or Firm* — LEE, HONG, DEGERMAN, KANG & WAIMEY

(57) ABSTRACT

A method for scoring training data samples according to an ability to preserve latent decision boundaries for previously observed classes while promoting learning from an input batch of new images from an online data stream, comprising: receiving the input batch of the new images from the online data stream, performing a memory retrieval process that retrieves data to be learned along with a new set of data from the memory to retain the previously learned knowledge, and performing a memory update process that selects and exchanges a small set of data to be saved in the memory in the memory update process. In addition, the method performs data valuation based on KNN-SV for both the memory retrieval and memory update processes to perform strategic and intuitive data selection based on the properties of KNN-SV.

19 Claims, 11 Drawing Sheets
(4 of 11 Drawing Sheet(s) Filed in Color)

(51) Int. Cl.
  *G06F 18/2113*  (2023.01)
  *G06F 18/2431*  (2023.01)
  *G06V 10/764*  (2022.01)
  *G06V 10/82*  (2022.01)

(52) U.S. Cl.
  CPC .......... *G06F 18/2431* (2023.01); *G06N 3/08* (2013.01); *G06V 10/764* (2022.01)

(56) References Cited

OTHER PUBLICATIONS

Jia, et al., "Efficient Task-Specific Data Valuation for Nearest Neighbor Algorithms" [online], Proceedings of the VLDB Endowment, vol. 12, No. 11: pp. 1610-1623, ISSN 2150-8097, doi: 10.14778/3342263.3342637, Jul. 1, 2019, 14 pages.

Shim, et al., "Online Class-Incremental Continual Learning with Adversarial Shapley Value" [online], Association for the Advancement of Artificial Intelligence, https://ssanner.github.io/papers/aaai21_aser.pdf, Aug. 31, 2020, 14 pages.

Jia, et al., "Efficient Task-Specific Data Valuation for Nearest Neighbor Algorithms," Jul. 2019, pp. 1610-1623, Proceedings of the VLDB Endowment, vol. 12, No. 11, https://doi.org/10.14778/3342263.3342637.

\* cited by examiner

ONLINE CLASS-INCREMENTAL CONTINUAL LEARNING WITH ADVERSARIAL SHAPLEY VALUE

CROSS-REFERENCE TO RELATED APPLICATION(S)

Pursuant to 35 U.S.C. § 119 (e), this application claims the benefit of U.S. Provisional Patent Application No. 63/030,268, filed on May 26, 2020, the contents of which are hereby incorporated by reference herein in its entirety.

FIELD

The present disclosure generally relates to training a neural network that scores memory data samples according to their ability to preserve latent decision boundaries for previously observed classes while interfering with latent decision boundaries of current classes being learned.

BACKGROUND

Machine learning is an area of artificial intelligence that includes a field of study that gives computers the capability to learn without being explicitly programmed. Specifically, machine learning is a technology used for researching and constructing a system for learning, predicting, and improving its own performance based on empirical data and an algorithm for the same. The machine learning algorithms construct a specific model in order to obtain the prediction or the determination based on the input data, rather than performing strictly defined static program instructions.

Conventional image-based deep learning models employ multiple GPUs to simultaneously learn from massive amounts of data. However, in many real-world applications, the data may contain confidential information and computing resources are limited. These constraints pose a major challenge in the storage and parallel processing of the dataset. These constraints may be mitigated by training Deep learning and deep neural networks (DNNs) in a sequential manner. DNNs are a sub-field of machine learning in artificial intelligence (A.I.) that deals with algorithms inspired from the biological structure and functioning of a brain to aid machines with intelligence. Generally, DNNs are defined as a set of machine learning algorithms which attempts a high level of abstraction through a combination of several nonlinear transformations and is a field of machine learning which teaches computers a way of thinking similar to a human in a large framework. Accordingly, DNNs are well suited for solving a number of computer vision problems such as segmentation, pose detection, classification, or the like.

However, DNNs are also known to suffer from catastrophic forgetting (e.g., forgetting of the existing knowledge) when they are continuously exposed to new data without reviewing the previously seen data. Specifically, catastrophic forgetting is the inability of a network to perform well in previously seen tasks after learning new tasks. To address this challenge, the field of continual learning (CL) studies the problem of learning from a (non-iid) stream of data, with the goal of preserving and extending the acquired knowledge over time. The goal of continual learning is to continually learn new knowledge while preserving the existing ones (e.g., minimizing catastrophic forgetting).

Many existing CL approaches use a task-incremental setting where data arrives one task (i.e., set of classes to be identified) at a time and the model can utilize task identity during both training and testing. Specifically, a common practice (multi-head evaluation) in this setting is to assign a separate output layer (e.g., head) for each task such that the model just needs to classify labels within a task. However, this setting requires additional supervisory signals at test time (i.e., the task identity) to select the corresponding head, which obviates its use when the task label is unavailable.

By contrast, an online class-incremental setting is a more realistic, but difficult setting because the model needs to learn new classes continually from an online data stream such that each sample is seen only once. In contrast to the task incremental setting, the online class-incremental setting adopts a single-head evaluation, where the model needs to classify all labels without task identity.

As image-based deep learning becomes pervasive on devices from smart phones to smart watches, there is a growing need to develop methods that continually learn from data while minimizing memory footprint and power consumption. While memory replay techniques have shown exceptional promise for this task of continual learning, a method for selecting which buffered images to replay is still an open question.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

So that the present disclosure can be understood by those of ordinary skill in the art, a more detailed description may be had by reference to aspects of some illustrative implementations, some of which are shown in the accompanying drawings.

Figure 1:
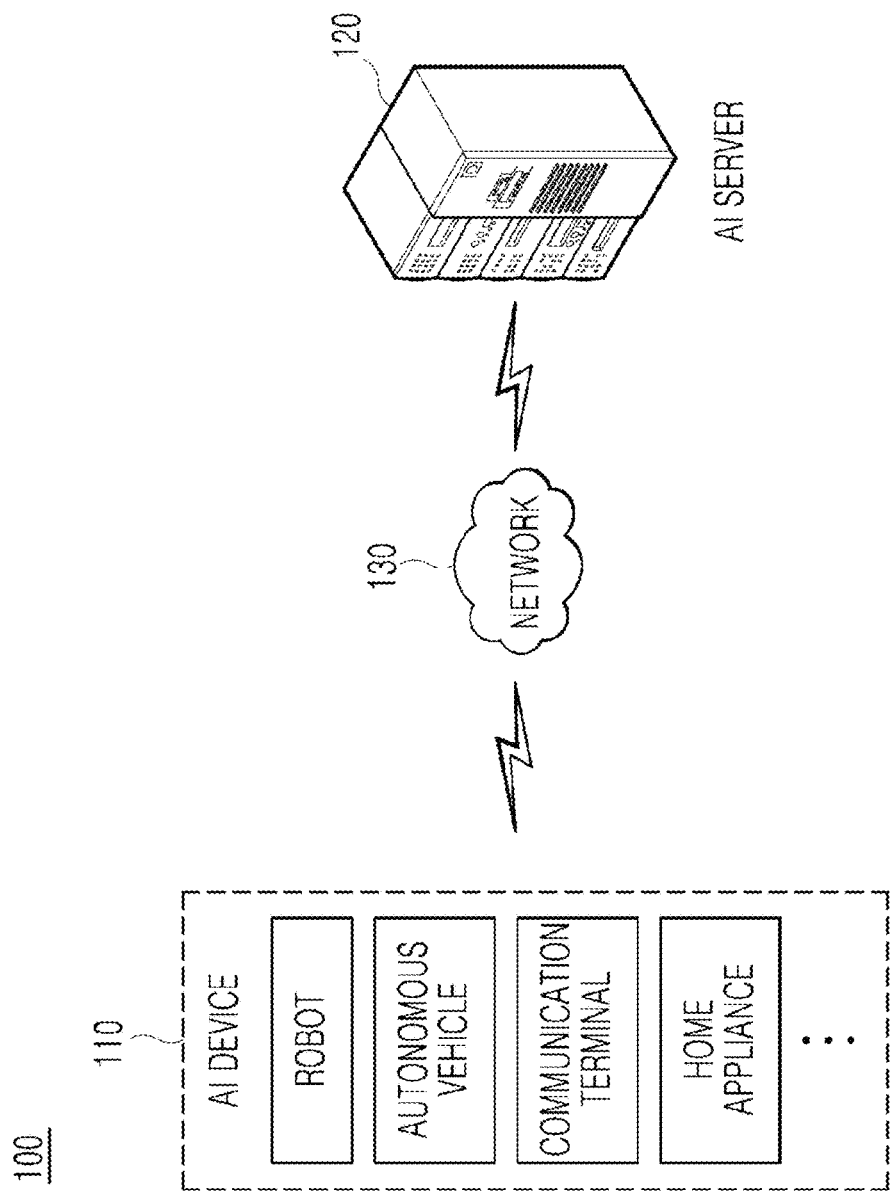
FIG. 1 is a view illustrating an example of an AI system comprising an AI device, an AI server, and a network connecting the above-mentioned components in accordance with some implementations.

In accordance with common practice, the various features illustrated in the drawings may not be drawn to scale.

Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

SUMMARY

An object of the present disclosure is to train a neural network using an online class-incremental setting to allow a model to learn new classes continually from an online data stream. To this end, a novel adversarial shapley value (ASV) scoring method scores memory data samples according to their ability to preserve latent decision boundaries for previously observed classes (to maintain learning stability and avoid forgetting) while interfering with latent decision boundaries of current classes being learned (to encourage plasticity and optimal learning of new class boundaries). The ASER method provides an improved performance as compared to other state-of-the-art replay-based continual learning methods on a variety of datasets.

An implementation of the present disclosure includes a method for scoring training data samples according to an ability to preserve latent decision boundaries for previously observed classes while promoting learning from an input batch of new images from an online data stream, the method comprising: receiving the input batch of the new images from the online data stream, performing a memory retrieval process comprising: obtaining an evaluation set for a first type of training data and a second type of training data from a first class-balanced random subset of the training data samples from the memory and a first candidate set from a second class-balanced random subset of the training data samples from the memory excluding any training data included in the second type of training data, wherein the evaluation set and the first candidate set comprise different data points, determining a K-Nearest Neighbor Shapley value (KNN-SV) of first candidate points among the first candidate set with respect to evaluation points among the evaluation set and the new images for the first type of training data and the second type of training data, selecting a subset of the first candidate points by aggregating the determined KNN-SVs of the first candidate points, wherein a size of the subset of the first candidate points corresponds to a same size of the received input batch of the new images, and concatenating the selected subset of the first candidate points to the received input batch of new images to form a mini-batch for training a neural network system with the formed mini-batch; performing a memory update process comprising: obtaining an evaluation set for a third type of training data from the first class-balanced random subset of the training data samples from the memory and a second candidate set from a randomly selected subset of the training data samples from the memory and the new images from the input batch, wherein a size of the second candidate set corresponds to a number of the new images in addition to a number of a size of the randomly selected training data samples from the memory, determining a KNN-SV of second candidate points among the second candidate set with respect to the evaluation points by obtaining latent features of the third type of training data from the evaluation set and the second candidate set, determining a mean of the determined KNN-SVs of the second candidate points across the evaluation points, and replacing the second candidate points that are the training data samples in the memory having a smaller average KNN-SV than the training data samples from the input batch determined to have a higher average KNN-SV.

In some implementations, the input batch may correspond to a set of new images sampled from the online data stream at a predefined time interval.

In some implementations, the subset of the training data samples retrieved from memory may use the evaluation set and the first candidate set rather than the training data samples.

In some implementations, the K-Nearest Neighbor Shapley value (KNN-SV) of first candidate points among the first candidate set with respect to evaluation points among the evaluation set and the new images for the first type of training data and the second type of training data may be determined by obtaining latent features of the evaluation set and the first candidate set, wherein a sign and a magnitude of the KNN-SV indicates a equivalence in class labels and a relative similarity of a particular candidate point and an particular evaluation point.

In some implementations, the first class-balanced random subset of the training data samples may be balanced in accordance with a number of examples from each class present in the memory.

In some implementations, a size of the evaluation set for the first type of training data may correspond to a size of a number of the new images, wherein a size of the evaluation set for the second type of training data and a size of the first candidate set may correspond to a number of samples per class.

In some implementations, the determined KNN-SVs of the first candidate points may be aggregated according to an adversarial Shapley Value (ASV) or a mean-variation ($ASV_\mu$), wherein the ASV corresponds to a single maximum value with respect to Type 2 evaluation points minus a single minimum value with respect to Type 1 evaluation points and the $ASV_\mu$ corresponds to an average value with respect to Type 2 evaluation points minus an average value with respect to Type 1 evaluation points.

In some implementations, the first type of training data correspond to a first group of data samples among the subset of the training data samples with a negative average KNN-SV of a large magnitude with respect to Type 1 evaluation set and the second type of training data may correspond to a second group of data samples among the subset of the training data samples with a positive average KNN-SV of a large magnitude with respect to Type 2 evaluation set.

In some implementations, the second type of training data may correspond to cooperative data points that are representative of training data samples in the memory to retain latent decision boundaries for previously observed classes and the first type of training data samples may correspond to adversarial data points that are near samples in the input batch and with different labels to differentiate current classes from previously seen classes, wherein the adversarial data points are adversarial to the new images from the online data stream.

In some implementations, the randomly selected subset of the training data samples from the memory along with the new images may be set based on a uniform random sampling.

Another implementation of the present disclosure includes a non-transitory memory storing one or more programs, which, when executed by one or more processors of an device, cause the device to be configured to perform:

receiving the input batch of the new images from the online data stream, a memory retrieval process, and a memory update process.

Yet another implementation of the present disclosure includes a non-transitory memory storing one or more programs, which, when executed by one or more processors of a device, cause the device to be configured to perform: receiving the input batch of the new images from the online data stream, a memory retrieval process, and a memory update process.

In accordance with some implementations, an electronic device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of an electronic device, cause the electronic device to perform or cause performance of any of the methods described herein. In accordance with some implementations, an electronic device includes: one or more processors, a non-transitory memory, and means for performing or causing performance of any of the methods described herein.

The present disclosure is not limited to what has been described above, and other aspects and advantages of the present disclosure not mentioned above will be understood through the following description of implementations of the present disclosure. Further, it will be understood that the aspects and advantages of the present disclosure may be achieved by the configurations described in claims and combinations thereof.

DETAILED DESCRIPTION

Hereinafter, the implementations disclosed in the present specification will be described in detail with reference to the accompanying drawings, the same or similar elements regardless of a reference numeral are denoted by the same reference numeral, and a duplicate description thereof will be omitted. In the following description, the terms "module" and "unit" for referring to elements are assigned and used exchangeably in consideration of convenience of explanation, and thus, the terms per se do not necessarily have different meanings or functions. Wherever possible, the same reference numbers will be used throughout the drawings to refer to the same or like parts. In the following description, known functions or structures, which may confuse the substance of the present disclosure, are not explained. The accompanying drawings are used to help easily explain various technical features, and it should be understood that the implementations presented herein are not limited by the accompanying drawings. As such, the present disclosure should be construed to extend to any alterations, equivalents, and substitutes in addition to those which are particularly set out in the accompanying drawings.

The terminology used herein is used for the purpose of describing particular example implementations only and is not intended to be limiting. As used herein, the singular forms "a," "an," and "the" may be intended to include the plural forms as well, unless the context clearly indicates otherwise. The terms "comprises," "comprising," "includes," "including," "containing," "has," "having" or other variations thereof are inclusive and therefore specify the presence of stated features, integers, steps, operations, elements, and/or components, but do not preclude the presence or addition of one or more other features, integers, steps, operations, elements, components, and/or groups thereof. Furthermore, these terms such as "first," "second," and other numerical terms, are used only to distinguish one element from another element. These terms are generally only used to distinguish one element from another.

Hereinafter, implementations of the present disclosure will be described in detail with reference to the accompanying drawings. Like reference numerals designate like elements throughout the specification, and overlapping descriptions of the elements will not be provided.

FIG. 1 is a view illustrating an example of an AI system comprising an AI device, an AI server, and a network connecting the above-mentioned components. While pertinent features are shown, those of ordinary skill in the art will appreciate from the present disclosure that various other features have not been illustrated for the sake of brevity and so as not to obscure more pertinent aspects of the example implementations disclosed herein.

Referring to FIG. 1, the AI device 100 may include a training engine of the present disclosure and for example, include at least one of a robot, an autonomous vehicle, a communication terminal (for example, a mobile phone, a smart phone, or a tablet PC), a device (not shown in FIG. 1) (e.g., the device 201 shown in FIG. 2), and a home appliance (for example, a robot cleaner), an image sensor, or a mobile phone.

Here, artificial intelligence refers to a field of studying artificial intelligence or a methodology to create the artificial intelligence and machine learning refers to a field of defining various problems treated in the artificial intelligence field and studying a methodology to solve the problems. In addition, machine learning may be defined as an algorithm for improving performance with respect to a task through repeated experience with respect to the task.

An artificial neural network (ANN) is a model used in machine learning, and may refer in general to a model with problem-solving abilities, composed of artificial neurons (nodes) forming a network by a connection of synapses. The ANN may be defined by a connection pattern between neurons on different layers, a learning process for updating model parameters, and an activation function for generating an output value.

The ANN may include an input layer, an output layer, and may selectively include one or more hidden layers. Each layer includes one or more neurons, and the ANN may include synapses that connect the neurons to one another. In an ANN, each neuron may output a function value of an activation function with respect to the input signals inputted through a synapse, weight, and bias.

A model parameter refers to a parameter determined through learning, and may include weight of synapse connection, bias of a neuron, and the like. Moreover, hyperparameters refer to parameters which are set before learning in a machine learning algorithm, and include a learning rate, a number of iterations, a mini-batch size, an initialization function, and the like.

The objective of training an ANN is to determine a model parameter for significantly reducing a loss function. The loss function may be used as an indicator for determining an optimal model parameter in a learning process of an artificial neural network.

The machine learning may train an artificial neural network by supervised learning.

Supervised learning may refer to a method for training an artificial neural network with training data that has been given a label. In addition, the label may refer to a target answer (or a result value) to be guessed by the artificial neural network when the training data is inputted to the artificial neural network.

As a result, an artificial intelligence based object identifying apparatus trains the artificial neural network using a machine learning algorithm or requests a trained artificial neural network from the AI server 120 to receive the trained artificial neural network from the AI server 120. Further, when the image is received, the object identifying apparatus may estimate a type of the object in the received image using the trained artificial neural network.

When the AI server 120 receives the request for the trained artificial neural network from the AI device 110, the AI server 120 may train the artificial neural network using the machine learning algorithm and provide the trained artificial neural network to the AI device 110. The AI server 120 may be composed of a plurality of servers to perform distributed processing. In this case, the AI server 120 may be included as a configuration of a portion of the AI device 110, and may thus perform at least a portion of the AI processing together.

The network 130 may connect the AI device 110 and the AI server 120. The network 130 may include a wired network such as a local area network (LAN), a wide area network (WAN), a metropolitan area network (MAN), or an integrated service digital network (ISDN), and a wireless network such as a wireless LAN, a CDMA, Bluetooth®, or satellite communication, but the present disclosure is not limited to these examples. The network 130 may also send and receive information using short distance communication and/or long distance communication. The short-range communication may include Bluetooth®, radio frequency identification (RFID), infrared data association (IrDA), ultra-wideband (UWB), ZigBee, and Wi-Fi (wireless fidelity) technologies, and the long-range communication may include code division multiple access (CDMA), frequency division multiple access (FDMA), time division multiple access (TDMA), orthogonal frequency division multiple access (OFDMA), and single carrier frequency division multiple access (SC-FDMA).

The network 130 may include connection of network elements such as a hub, a bridge, a router, a switch, and a gateway. The network 130 can include one or more connected networks, for example, a multi-network environment, including a public network such as an internet and a private network such as a safe corporate private network. Access to the network 130 may be provided through one or more wire-based or wireless access networks. Furthermore, the network 130 may support the Internet of Things (IoT) network for exchanging and processing information between distributed elements such as things, 3G, 4G, Long Term Evolution (LTE), 5G communications, or the like.

Figure 2:
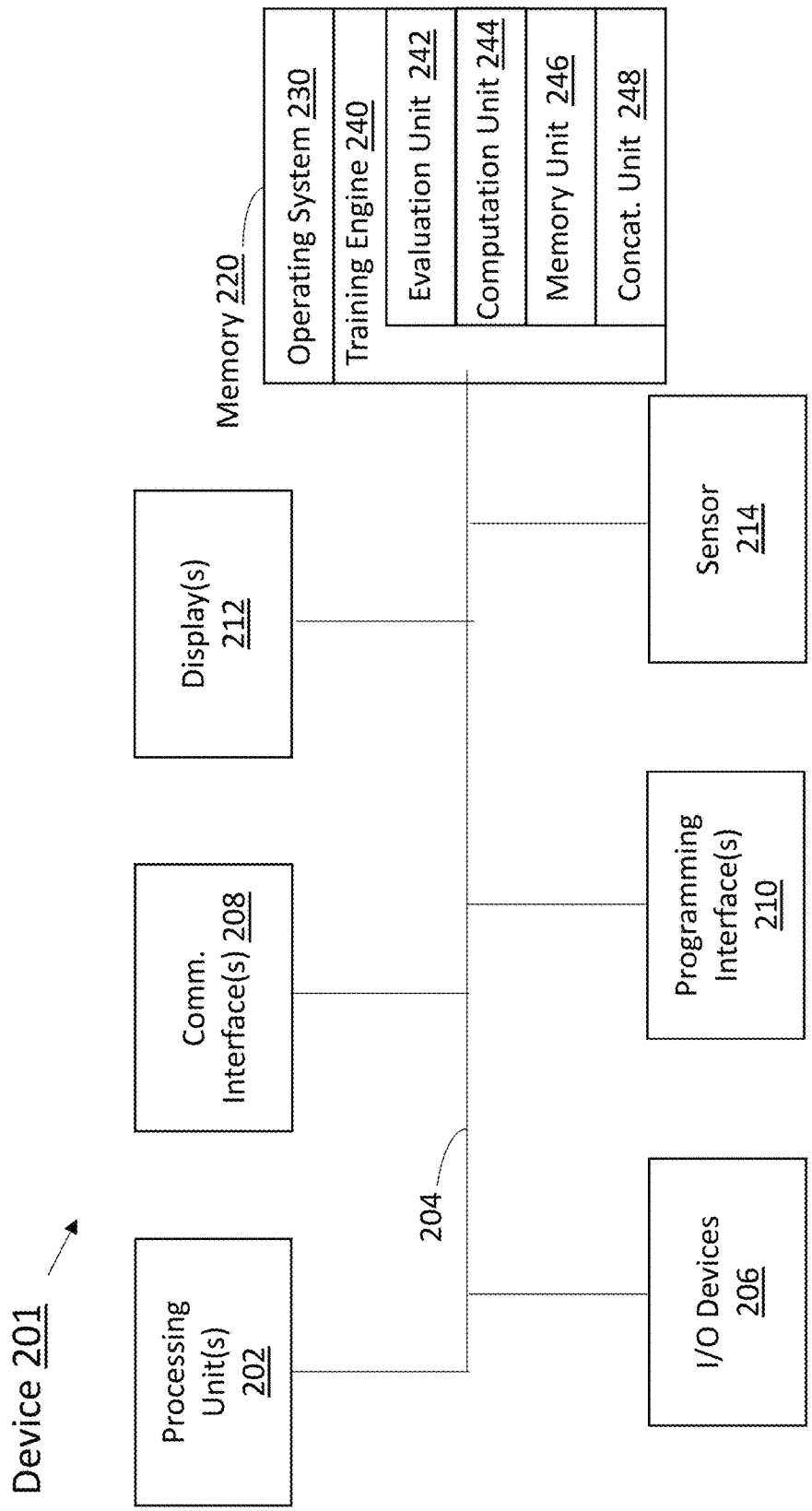
FIG. 2 is a block diagram of an example of a device in accordance with some implementations.

FIG. 2 is a block diagram of an example of a device 201 in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the AI device (e.g., the AI device 110 shown in FIG. 1) or the device 201 includes one or more processing units 202 (e.g., microprocessors, ASICs, FPGAs, GPUS, CPUs, processing cores, and/or the like), one or more I/O devices and sensors 206, one or more communications interfaces 208 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interfaces), one or more programming (e.g., I/O) interfaces 210, one or more displays 212, one or more exterior image sensors 214, a memory 220, and one or more communication buses 204 for interconnecting these and various other components.

In some implementations, the one or more communication buses 204 include circuitry that interconnects and controls communications between system components.

In some implementations, the one or more displays 212 are capable of presenting content. In some implementations, the one or more displays 212 are also configured to present flat video content to the user (e.g., a 2-dimensional or "flat" audio video interleave (AVI), flash video (FLV), Windows Media Video (WMV), or the like file associated with a TV episode or a movie, or live video pass-through of the operating environments. In some implementations, the one or more displays 212 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro mechanical systems (MEMS), and/or the like display types. In some implementations, the one or more displays 212 correspond to diffractive, reflective, polarized, holographic, etc. waveguide displays. For example, the device 201 includes a single display. In another example, the device 201 includes a display for each eye of the user.

In some implementations, the one or more exterior image sensors 214 are configured to obtain image data frames. For example, the one or more optional exterior- and/or interior-facing image sensors 214 correspond to one or more RGB cameras (e.g., with a complementary metal-oxide-semiconductor (CMOS) image sensor, or a charge-coupled device (CCD) image sensor), infrared (IR) image sensors, event-based cameras, and/or the like.

The memory 220 includes high-speed random-access memory, such as DRAM, SRAM, DDR RAM, or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and a training engine 240.

The optional operating system 230 includes procedures for handling various basic system services and for performing hardware dependent tasks. In some implementations, the training engine 240 is configured to traing input data. To that end, in various implementations, the training engine 240 includes an evaluation unit 242, a computation unit 244, a memory unit 246, and a concatenation unit 248.

In some implementations, the evaluation unit 242 is configured to retrieve an data stream such that an output of the data stream corresponds to an input batch and to set each retrieved input batch as an evaluation point. In some implementations, there are three types of evaluation sets-a first type for memory retrieval, a second type for memory retrieval, and a third type for memory update. In some implementations, the evaluation unit 242 may correspond to one or more processors. In some implementations, the evaluation unit 242 may correspond to software components configured to be executed by one or more processors. To that end, in various implementations, the evaluation unit includes instructions and/or logic therefor, and heuristics and metadata therefor.

In some implementations, the computation unit 244 is configured to score memory data samples according to an ability to preserve latent decision boundaries for previously observed classes. For example, the computation unit 244 may determine a K-Nearest Neighbor Shapley value (KNN-SV) of a subset of training samples retrieved from the memory. In some implementations, the evaluation unit 242 may correspond to one or more processors. In some implementations, the evaluation unit 242 may correspond to one or more processors. In some implementations, the evaluation unit 242 may correspond to software components configured to be executed by one or more processors. To that end, in various implementations, the computation unit includes instructions and/or logic therefor, and heuristics and metadata therefor.

In some implementations, the memory unit 246 is configured to retrieve two types of data samples from the memory based on the KNN-SV and also to replace samples in the memory having a smaller average KNN-SV score with samples in the input batch determined to have a higher average KNN-SV score. In some implementations, the memory unit 246 may correspond to one or more processors. In some implementations, the memory unit 246 may correspond to software components configured to be executed by one or more processors. To that end, in various implementations, the memory unit 246 includes instructions and/or logic therefor, and heuristics and metadata therefor.

In some implementations, the concatenation unit 248 may concatenate a group of retrieved data samples and the new images in the input batch to form a mini-batch for training. In some implementations, the memory unit 246 retrieves data samples that maximize ASV or $ASV_\mu$ which encodes two types of evaluation criteria into a single equation. In some implementations, there may be a single set of retrieved samples and each of the retrieved data points may have a high value for one of the two criteria (Type 1 or Type 2) or for both. In some implementations, the concatenation unit 248 may correspond to one or more processors. In some implementations, the concatenation unit 248 may correspond to software components configured to be executed by one or more processors. To that end, in various implementations, the concatenation unit 248 includes instructions and/or logic therefor, and heuristics and metadata therefor.

Although the evaluation unit 242, the computation unit 244, the memory unit 246, and the concatenation unit 248 are shown as residing on a single device (e.g., the device 201), it should be understood that in some implementations, any combination of the evaluation unit 242, the computation unit 244, the memory unit 246, and the concatenation unit 248 may be located in separate computing devices.

Moreover, FIG. 2 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Image-based deep learning is a pervasive, but computationally expensive and memory intensive task. Yet the need for such deep learning on personal devices to preserve privacy, minimize communication bandwidth, and maintain real-time performance necessitates the development of methods that can continuously learn from streaming data while minimizing memory storage and computational footprint. However, catastrophic forgetting is well-documented defect of deep neural networks (DNNs) that prevents it from learning continually. Specifically, catastrophic forgetting is the inability of a network to perform well in previously seen tasks after learning new tasks. To address this problem, the field of CL studies the problem of learning from a not independent and identically distributed (non-iid) stream of data with the goal of preserving and extending the acquired knowledge over time.

Continual learning is a technology that has enabled deep learning models to perform fast "updates" based on data. This aspect has made it highly in demand by the industry. Compared to previous research, continual learning has achieved groundbreaking results with respect to effective updates and use of memory.

Many existing CL approaches use a task-incremental setting where data arrives one task (e.g., set of classes to be identified) at a time and the model can utilize task identity during both training and testing. Specifically, a common practice (multi-head evaluation) is to assign a separate output layer (e.g., head) for each task such that the model just needs to classify labels within a task. However, this setting requires additional supervisory signals at test time (namely, the task identity) to select the corresponding head, which obviates its use when the task label is unavailable.

Figure 3A:
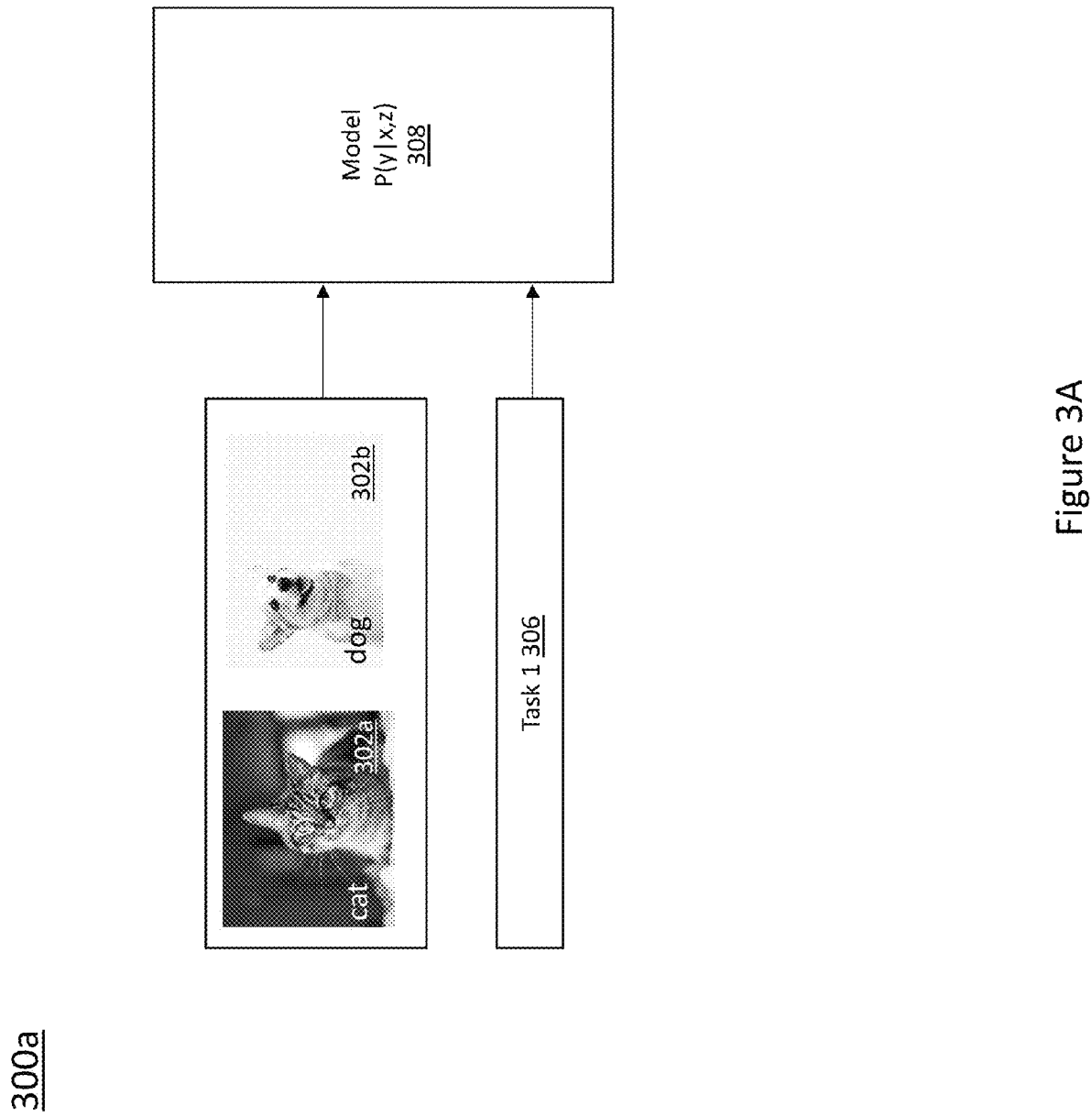
FIGS. 3A and 3B illustrate a comparison between the task-incremental setting and the online-incremental setting in accordance with some implementations.
Figure 3B:
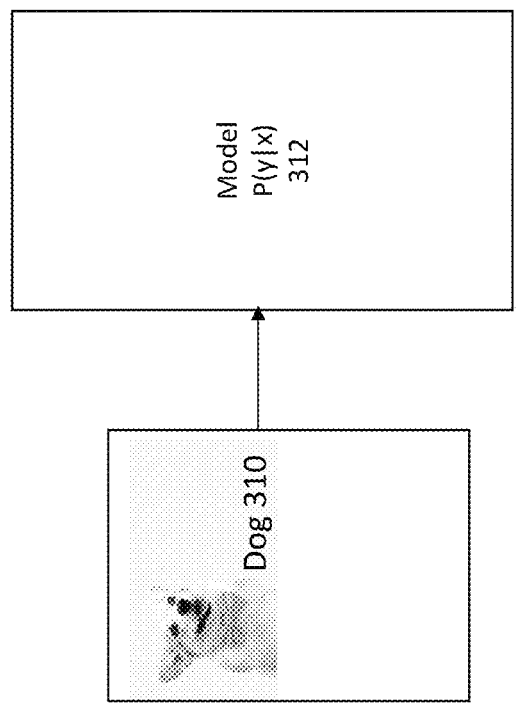

FIGS. 3A and 3B illustrate a comparison between the task-incremental setting and the online-incremental setting in accordance with some implementations.

As shown in FIGS. 3A and 3B, in continual learning, two settings (task-incremental setting 300*a* and an online class-incremental setting 300*b*), are often considered for classification problems. In both settings, a DNN model learns from a series of different learning tasks over time. Each task is comprised of images from different classes and the model is subject to a specific learning task at a given time.

As shown in FIG. 3A, in the task-incremental setting 300*a*, a model 308 has access to all data instances belonging to the current task, and it only has to classify among the classes given in that task 306 (e.g., multi-head setting). This setting is simple because the model 308 has abundant data, and it always knows what task 306 to look at. During inference, the model 308 is given test images 302*a*, 302*b* along with their corresponding task identifiers. For example, if the online data stream consisted of five tasks, and the first task happened to be a cat versus dog classification, the task identifier given for any images belonging to the first task would be "task 1." Similarly, any images from a second task (e.g., sedans vs. trucks) would have a task identifier of "task 2." With the task information, the model 308 only needs to make a prediction relevant to that task 306. However, the task-incremental setting 300a is not practical in real-world applications because task information is not available and data may be streamed.

By contrast, as shown in FIG. 3B, an online class-incremental setting 300b provides a more practical and challenging learning environment. Specifically, an online class-incremental setting 300b is a DNN model 312 that needs to learn new classes continually from an online data stream such that each sample is seen only once. In contrast to the task-incremental setting 300a, the online class-incremental setting 300b adopts the single-head evaluation, where the DNN model 312 needs to classify all labels without task identity.

In the online class-incremental setting 300b, a DNN model 312 sees one or a small number of new images 310 at a time from a data stream belonging to the current task. It does not have any information regarding tasks. As a result, it has to classify among all classes from all tasks. This is a difficult single-head setting that is prone to catastrophic forgetting. Nothing that task identifiers are artificial information, this setting allows a comparison of different continual learning algorithms in a realistic setting under the influence of severe catastrophic forgetting. The online class-incremental setting is another test bed for continual learning algorithms. If a continual learning algorithm works well in this setting, it is considered to be effective in reducing catastrophic forgetting. The online-incremental setting is relatively more challenging and realistic than a task incremental setting because it does not allow use of task information. As such, the task identifiers can be considered as "cheat sheets" or references that prevent the assessment of a true ability of reducing the catastrophic forgetting. Several existing continual learning algorithms have also adopted the online class-incremental setting. ASER was developed to solve the problem of catastrophic forgetting in this setting.

A comparison between the task-incremental setting and the online-incremental setting is summarized below:

| Task-Incremental | Online Class-Incremental |
| --- | --- |
| Task-ID is required | Task-ID is not required |
| Predict a label within task z | Predict a label within all tasks |
| Data arrives one task at a time | Data arrives one image (or a small batch) at a time |
| RAM-intensive | Less RAM-intensive |
| Multi-head setting is artificial | More realistic and challenging |

Current CL methods can be taxonomized into three major categories: regularization-based, parameter isolation, and memory-based methods. Regularization-based methods incorporate an additional penalty term into the loss function to penalize the update of critical model parameters. Other regularization-based methods imposed knowledge distillation techniques to penalize the feature drift on previous tasks. Parameter isolation methods assign per-task parameters to bypass interference by expanding the network and masking parameters to prevent forgetting. Memory-based methods deploy a memory buffer to store a subset of data from previous tasks. The samples from the buffer can either be used to constrain the parameter updates such that the loss on previous tasks cannot increase or simply for replay to prevent forgetting.

Regularization methods only protect the model's ability to classify within a task and thus they do not work well in this particular image recognition setting where the ability to discriminate among classes from different tasks is crucial. In addition, most parameters isolation methods require task identity during interference, which violates the particular image recognition setting. Therefore, a replay approach is considered because it has shown to be successful and efficient for the online class-incremental setting.

A key question for replay-based methods is how to update and retrieve memory samples when new data arrives since the memory buffer is the only place to store data from previous tasks.

Figure 4:
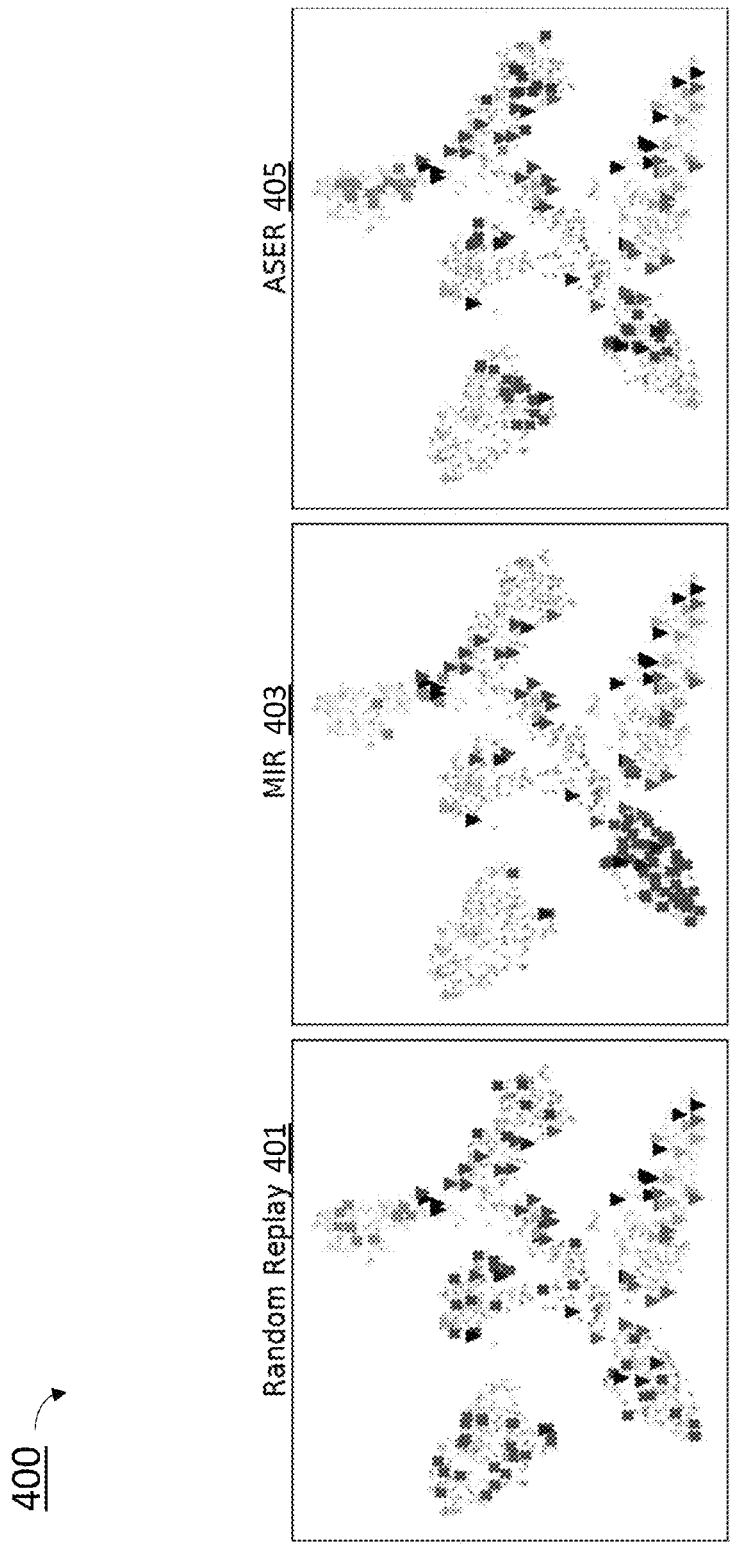
FIG. 4 is a diagram illustrating a 2D t-Distributed Stochastic Neighbor Embedding (t-SNE) visualization of CIFAR-100 data embeddings and their class labels showing current task samples and retrieved memory samples for rehearsal in accordance with some implementations.

FIG. 4 is a diagram 400 illustrating a 2D t-SNE visualization of CIFAR-100 data embeddings and their class labels showing current task samples and retrieved memory samples for rehearsal in accordance with some implementations.

A t-SNE is a statistical method for visualizing high-dimensional data by giving each datapoint a location in a two or three-dimensional map. T-SNE is a nonlinear dimensionality reduction technique well-suited for embedding high-dimensional data for visualization in a low-dimensional space of two or three dimensions. Specifically, it models each high-dimensional object by a two- or three-dimensional point in such a way that similar objects are modeled by nearby points and dissimilar objects are modeled by distant points with high probability. The t-SNE algorithm calculates a similarity measurement between pairs of instances in the high dimensional space and in the low dimension space. It then tries to optimize these two similarity measures using a cost function.

Specifically, FIG. 4 shows a diagram 400 depicting 2D t-SNE visualization of CIFAR-100 data embeddings, their class labels in different colors, and current task samples (triangles), memory samples (pale circle), and retrieved memory samples for rehearsal (bold x). For each point, the latent embeddings from reduced ResNet18 were obtained. ResNet18 is a well-known convolutional neural network that is trained on more than a million images from the ImageNet database. The ResNet18 network is 18 layers deep and can classify images into 1000 object categories such as keyboard, mouse, pencil, and animals.

Random Replay 401 distributes its retrieved samples non-strategically, Maximally Interfered Retrieval (MIR) 403 disproportionally selects seemingly redundant samples in a single class (red), whereas ASER 405 strategically retrieves memory samples that are representative of different classes in memory but also adversarially located near class boundaries and current task samples.

MIR 403 chooses replay samples whose loss most increases after a current task update. MIR 403 is a recently proposed method aiming to improve the MemoryRetrieval strategy. MIR 403 chooses replay samples according to loss increases given the estimated parameter based on the newly arrived data. However, samples with significant loss increases tend to be similar in the latent space, which may lead to redundancy in the retrieved data, as shown below in FIG. 4. Like Experience Replay, MIR 403 uses reservoir sampling for the MemoryUpdate.

However, if the visualized latent space of retrieved memory samples is chosen by the Random Replay 401, and MIR 403, then FIG. 4 shows that the methods mentioned above fail to strategically select samples that both preserve existing memory-based class boundaries while protecting against current task samples that interfere with these boundaries.

The deficiencies observed by the methods in FIG. 4 are addressed by a novel replay-based method called Adversarial Shapley value Experience Relay (ASER), which will be described in more detail below. ASER is inspired by the Shapley value (SV) used in cooperative game theory to fairly distribute total gains to all players. In this CL setting, the SV is used to determine the contribution of memory samples to learning performance. An adversarial perspective of SV for CL memory retrieval that aims to score memory samples according to their preservation of decision boundaries for "friendly" samples in the memory buffer to maintain learning stability and avoid forgetting and their interference with "opponent" samples from the current task that disrupt existing memory-based class boundaries to encourage plasticity and optimal learning. As will be shown in FIGS. 5-6 below, ASER will be demonstrated to provide competitive or improved performance compared to state-of-the art replay-based methods through experiments on three commonly used benchmarks in the CL literature, especially when the memory buffer size is small.

An online supervised class-incremental learning setting is considered such that an online class-incremental setting corresponds to a harsh test bed that allows an examination of which CL algorithm is better at avoiding catastrophic forgetting. More concretely, a neural network classifier $f: R^d \rightarrow R^C$, parameterized by $\theta$ will receive input batches $B_n^t$ of size b from $task_t$. $Task_t$ consists of classes that the classifier has never seen before in $task_{1:t}$. Moreover, the single-head evaluation setup is adopted because the classifier has no access to task identity during inference and hence must choose among all labels. The goal is to train the classifier f to continually learn new classes from the data stream without forgetting.

Since the goal of CL is to continually acquire new knowledge while preserving existing learning, two standard metrics are used to measure performance: "average accuracy" for overall performance and "forgetting" to measure how much acquired knowledge an algorithm has forgotten. In average accuracy, $a_{i,j}$ is the accuracy evaluated on the held-out test set of task j after training the network from task 1 to i. In average forgetting, $fi_j$ represents how much the model forgets about task j after being trained on task i. For T tasks:

$$\text{Average Accuracy}(A_T) = \frac{1}{T}\sum_{j=1}^{T} a_{T,j}$$

$$\text{Average Forgetting}(F_T) = \frac{1}{T-1}\sum_{j=1}^{T-1} f_{T,j}$$

$$\text{where } f_{i,j} = \max_{l \in \{1,\ldots,i-1\}} a_{l,j} - a_{i,j}$$

Continual learning can be approached in other various ways, but experience replay (ER) is one of the simplest method that relies on uniform random sampling. Compared with the simplest baseline model that fine-tunes the parameters based on the new task without any measures to prevent forgetting, the ER makes two simple modifications: (1) it stores a subset of the samples from past tasks in a memory buffer $\mathcal{M}$ of limited size M; (2) it concatenates the incoming minibatch $B_n$ with another minibatch $B\mathcal{M}$ of samples selected from the memory buffer. Then, ER takes a SGD step with the combined batch, followed by an online update of the memory. A generic ER algorithm is presented below:

| Algorithm 1: Generic ER-based method |
|---|
| Input: Batch size b, Learning rate α |
| Initialize: Memory $\mathcal{M} \leftarrow \{\} * M$; Parameters θ; Counter n ← 0 |
| 1    for t ∈ {1, . . . , T} do |
| 2      for $B_n \sim D_t$ do |
| 3        $B_{\mathcal{M}} \leftarrow$ MemoryRetrieval($B_n, \mathcal{M}$) |
| 4        $\theta \leftarrow$ SGD($B_n \cup B_{\mathcal{M}}, \theta, \alpha$) |
| 5        $\mathcal{M} \leftarrow$ MemoryUpdate($B_n, \mathcal{M}$) |
| 6        n ← n + b |
| 7    return θ |

As seen in Algorithm 1 above, the MemoryRetrieval in line 3 and the MemoryUpdate in line 5 differentiates the generic ER-based methods from various replay-based methods. Although there exists another stream of replay methods that utilize a generative model to produce virtual samples instead of using a memory buffer, recent research has demonstrated the limitations of such approaches with convolutional neural networks in datasets such as CIFAR-10. Thus, the memory-based approach is the focus in this application.

Basic ER is a simple, but strong baseline that applies reservoir sampling in MemoryUpdate and random sampling in MemoryRetrieval. Despite its simplicity, recent research has shown that naïve ER outperforms many specifically designed CL approaches with and without a memory buffer.

The ER method selects a small amount of data from the data stream and stores them in the memory. The saved data can then be replayed along with new data for learning. The ER method is widely used because it shows good performance even when the task-related information is not available and does not require special conditions other than the data storage and the calculations related to the selection process. The ER has two main processes: memory update and memory retrieval. A small set of data to be saved in the memory are selected and exchanged in the memory update process. In the memory retrieval process, the data to be learned along with the new set of data are retrieved from the memory to retain the previously learned knowledge. ASER performs data valuation based on KNN-SV for both the memory update and memory retrieval processes to perform strategic and intuitive data selection.

As already described above in paragraph 71, MIR aims to improve the MemoryRetrieval strategy by choosing replay samples according to loss increases given the estimated parameter based on the newly arrived data. However, samples with significant loss increases tend to be similar in the latent space, which may lead to redundancy in the retrieved data, as shown in FIG. 4. Like ER, MIR also uses reservoir sampling for the MemoryUpdate.

Gradient-based Sample Selection (GSS) is different from MIR because GSS pays attention to the MemoryUpdate strategy. Specifically, GSS tries to diversify the gradients of the samples in the memory buffer. Similar to ER, GSS uses random sampling in MemoryRetrieval.

As shown in FIG. 4, after analyzing the latent embeddings of memory samples, the natural clustering effect of classes can be observed in the embedding space. In addition, FIG. 4 shows that some samples may be more important than others in terms of preserving what the neural network has learned. For example, data from one class that are near the boundary with data from another class in some sense act as sentinels to guard the decision boundaries between classes. This suggests the question of how to value data in the embedded space in terms of their contribution to accurate classification?

Accordingly, given that the embedding plot of FIG. 4 suggests that a new data point is likely to take the classification of its nearest neighbors in the embedding space, the question may be rephrased as asking how much each data point in memory contributes to correct classification from the perspective of a K-Nearest Neighbors (KNN) classifier.

Shapley Value (SV) was originally proposed in cooperative game theory to decide the share of total gains for each player in a coalition. The SV has a set of mathematical properties that make it appealing to many applications: group rationality, fairness, and additivity. Conversely, it can be shown that the SV is the only allocation scheme that satisfies these three properties.

In the context of machine learning, the SV has been used to estimate the individual contribution of data points to the performance of a trained model in the context of all other data. Formerly, N denotes the number of data points and I={1, . . . , N} denotes the associated index set. Then, each datum is interpreted as a player of a cooperative game with the goal of maximizing test-time performance. Let v(S) define a utility function of the ML model over a subset $S \subset I$ on which the model is trained. Then, the SV of a data point of index/with the utility v(S) is the following:

$$s(i) = \frac{1}{N} \sum_{S \subseteq I \setminus \{i\}} \frac{1}{\binom{N-1}{|S|}} [v(S \cup \{i\}) - v(S)] \quad (1)$$

Intuitively, when every possible subset of data points is considered, s(i) measures the average marginal improvement of utility given by the sample i. By setting the utility as test accuracy in ML classification tasks, the SV can discover how much of the test accuracy is attributed to a training instance.

An efficient method for SV computation in a KNN classification framework has been developed by recent works. This is a critical innovation because the direct powerset-based computation of the SV requires $O(2^N)$ evaluations for general, bounded utility functions. Furthermore, each evaluation involves training an ML model with a given subset of data(S). This is prohibitive in most modern deep learning applications-particularly, online CL with neural networks. As summarized below, the exact KNN-SV can be computed in O(N log N).

Let $(x^{ev}_j, y^{ev}_j)$ denote an evaluation point and $D_c = \{(x_i, y_i)\}_{i=1}^{N_c}$ a candidate set, where $y^{ev}_j$ and $y_i$ are labels. The KNN-SVs of all examples in $D_c$ with respect to the evaluation point with the utility function (2) is computed. The KNN utility function over a subset $S \subset D_c$ measures the likelihood of correct classifications:

$$v_{j,KNN}(S) = \frac{1}{K} \sum_{k=1}^{\min(K,|S|)} \mathbb{1}[y_{\alpha_k(S)} = y^{ev}_j] \quad (2)$$

where $\alpha_k(S)$ is the index of the kth closest sample (from $x^{ev}_j$) in S based on some distance metric. Each sample I is assigned a KNN-SV—$s_j(i)$—that represents the average marginal contribution of the instance to the utility. Due to the additivity of SV, the KNN-SV of a candidate with respect to the evaluation set $(D_e = \{(x^{ev}_j, y^{ev}_j)\}_{j=1}^{N_e})$ by taking the average:

$$s_{avg}(i) = \frac{1}{N_e} \sum_{j=1}^{N_e} s_j(i)$$

is obtained.

Equations (3) and (4) show how to recursively compute the exact KNN-SVs of samples in $D_c$ with respect to $(x^{ev}_j, y^{ev}_j) \in D_e$ starting from $x_{\alpha N_c}$ (the farthest point from $x^{ev}_j$):

$$s_j(\alpha_{N_c}) = \frac{\mathbb{1}[y_{\alpha_{N_c}} = y^{ev}_j]}{N_c} \quad (3)$$

$$s_j(\alpha_m) = s_j(\alpha_{m+1}) + \frac{\mathbb{1}[y_{\alpha_m} = y^{ev}_j] - \mathbb{1}[y_{\alpha_{m+1}} = y^{ev}_j]}{K} \left(\frac{\min(K, m)}{m}\right) \quad (4)$$

Here, $s_j(\alpha_m)$ is the KNN-SV of the mth closest candidate sample from $x^{ev}_j$. Note that the dependency on the utility v is suppressed as $v_{KNN}$ is always used.

The KNN-SV computation can be leveraged to value data in the embedded space in terms of its contribution to accurate classification. Accordingly, ASER may leverage the SV for both MemoryRetrieval and MemoryUpdate using this global data valuation method.

A key insight with the ASER method for MemoryRetrieval is to balance the competing needs at the crux of CL. In other words, there is a need to retrieve memory samples for replay that prevent forgetting while also finding samples that maximally interfere with the incoming batch $B_n$ to ensure plasticity in learning. This allows ASER to leverage a cooperative notion of the SV (where a higher SV is better) as it relates to $\mathcal{M}$, but also leverage an adversarial notion of the SV as it relates to $B_n$ (where lower and negative SVs indicate interference). In addition, ASER also adopts a cooperative SV approach to the MemoryUpdate process.

A neural network classifier (f) may be viewed in two separate parts: a feature extractor ($f_{ext}:R^d \rightarrow R^h$) and a fully connected neural classifier ($f_{cl}:R^h \rightarrow R^C$), where h is the dimensionality of the latent space $\mathcal{X}^l$. In addition, KNN classifier is implicitly defined for introducing KNN-SV and the Euclidean distance in $\mathcal{X}^l$ is used. The KNN classifier is not explicitly defined for training or testing. Next, the KNN-SVs of candidate samples with respect to evaluation samples is computed using Equations 3 and 4.

ER's performance depends on determining what to store in memory (i.e., Memory Update) and what to replay from memory (i.e., MemoryRetrieval). A key desiderata is that the samples in $\mathcal{M}$ and $B_n$ should be well-separated by $f_{ext}$ in the latent space. To this end, two types of samples in $\mathcal{M}$ will be targeted: those near the samples in $B_n$ but with different labels (Type 1); and those that are representative of samples in the memory (Type 2). Training with samples in Type 1 will encourage the model to learn to differentiate current classes from previously seen classes while the samples in Type 2 help retain latent decision boundaries for previously observed classes.

The intuition as to how samples interfere and cluster with each other in the latent space is based on two properties of the KNN-SV. Given a candidate sample $i \in D_c$ and an evaluation set $D_e$, the KNN-SV of the point i with respect to an evaluation point $j \in D_e$, i.e. $s_j(i)$, satisfies the following:

Property 1. $s_j(i) > 0$ if and only if $y_i = y^{ev}_j$. Also, $s_j(i) = 0$ only when $S = \{i' | y_{i'} = y^{ev}_j, \forall i' \in \{i+1, \ldots, N_c\}\} = \emptyset$.

Property 2. $|s_j(m)|$ is a non-increasing function of m for m such that $y_m = y^{ev}_j$. Similarly, $|s_j(n)|$ is a non-increasing function of n for n such that $y_n \neq y^{ev}_j$. And for $m \geq K$, $|s_j(m)| - |s_j(m')| > 0$ holds for $m < m'$, where m' is the smallest index with $\mathbb{1}[y_m = y^{ev}_j] = \mathbb{1}[y_m = y^{ev}_j]$, if there exists $l \in (m, m')$ such that $\mathbb{1}[y_l = y^{ev}_j] \neq \mathbb{1}[y_m = y^{ev}_j]$. In other words, as i gets closer to the evaluation point j, $|s_j(i)|$ cannot decrease for points with the same $\mathbb{1}[y_i = y_j^{ev}]$, and for i≥K, it can only increase when there exist more than one differently labeled points.

The first property states that a candidate sample i has a positive KNN-SV if it has the same label as the evaluation point being considered (cooperative) and the sample will have a negative KNN-SV if its label is different than the evaluation point (adversarial). By combining both properties, if sj(i) is large, the candidate i is close to the evaluation point j in the latent space ($\mathcal{X}^l$) and has the same label ($y_i = y_j^{ev}$). On the other hand, if $s_j(i)$ is a negative value of large magnitude, then i is close to j, yet has a different label ($y_i \neq y_j^{ev}$). Thus, a good data candidate will have a high positive SV for memory $\mathcal{M}$ and a negative SV with large magnitude for the current input task $B_n$. Therefore, a sense of how the candidate samples are distributed with respect to the evaluation set in $\mathcal{X}^l$ can be gathered by examining the KNN-SVs of candidate samples.

The adversarial SV (ASV) that encodes the Type 1 and Type 2 criteria may be defined by:

$$ASV(i) = \max_{j \in S_{sub}} s_j(i) - \min_{k \in B_n} s_k(i) \quad (5)$$

as well as a "softer" mean variation $ASV_\mu$ $$ASV_\mu(i) = \left[\frac{1}{|S_{sub}|} \sum_{j \in S_{sub}} s_j(i)\right] - \left[\frac{1}{b} \sum_{k \in B_n} s_k(i)\right] \quad (6)$$

where i∈$\mathcal{M}$ \$S_{sub}$ and $S_{sub}$ is constructed by subsampling some number of examples from $\mathcal{M}$ such that it is balanced in terms of the number of examples from each class. This prevents omitting any latent decision boundaries of classes in the memory. It is noted that $S_{sub}$ is used as the evaluation set in the first term, whereas the input batch $B_n$ forms the evaluation set in the latter term. The candidate set is a class-balanced set of size $N_C$ selected from $\mathcal{M}' = \mathcal{M}$ \$S_{sub}$, and samples of size b$\mathcal{M}$ are retrieved from the set that have the highest ASVs (see Algorithm 2 below). As such, the ER method uses the score ASV (equation 5) as ASER, while $ASER_\mu$ uses $ASV_\mu$ instead.

It is further noted that both ASER methods do not greedily retrieve samples with the smallest distances to either $S_{sub}$ or $B_n$. This is because for a single evaluation point j, $s_j(\alpha_m) = s_j(\alpha_{m+1})$ when $y_{\alpha m} = y_{\alpha m+1}$. As such, a few points can have the same score even if some of them are farther from the evaluation point. This is in contrast to a pure distance-based score where the closest point gets the highest score.

Figure 5:
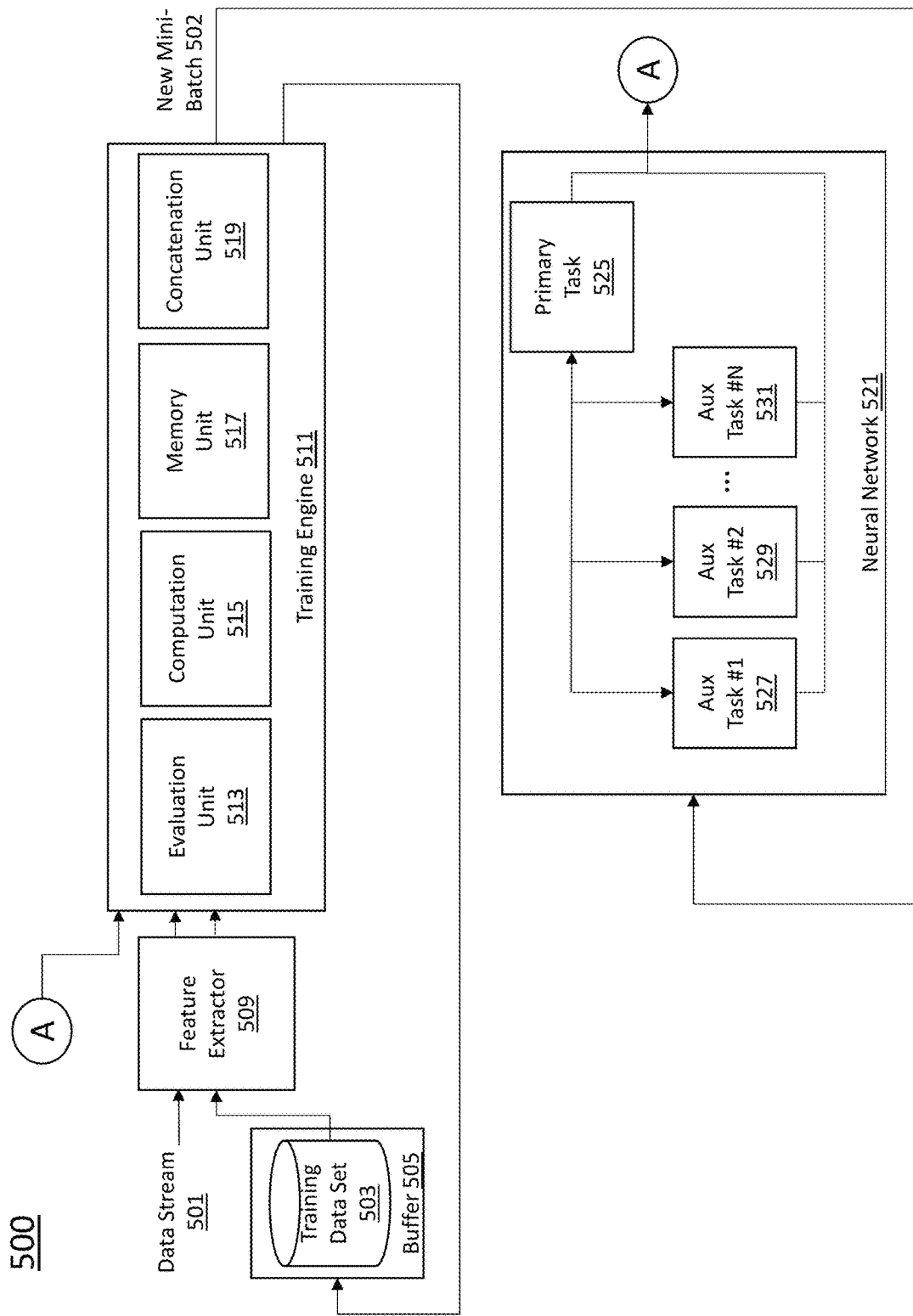
FIG. 5 is a block diagram of an example operating environment for training a neural network using an ASER method in accordance with some implementations.

FIG. 5 is a block diagram of an example operating environment for training a neural network using an ASER method in accordance with some implementations. In various implementations, the process environment 500 or portions thereof are included in a device or system such as a controller, a server, a computer, a laptop computer, a tablet device, a mobile phone, a smartphone, or a wearable computing device (e.g., a head-mounted display (HMD)). While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, in some implementations, the process environment 500 includes at least an online data stream 501, a training data set 503 stored in a memory buffer 505, a feature extractor 509, a training engine 511, and a neural network 521.

Figure 10:
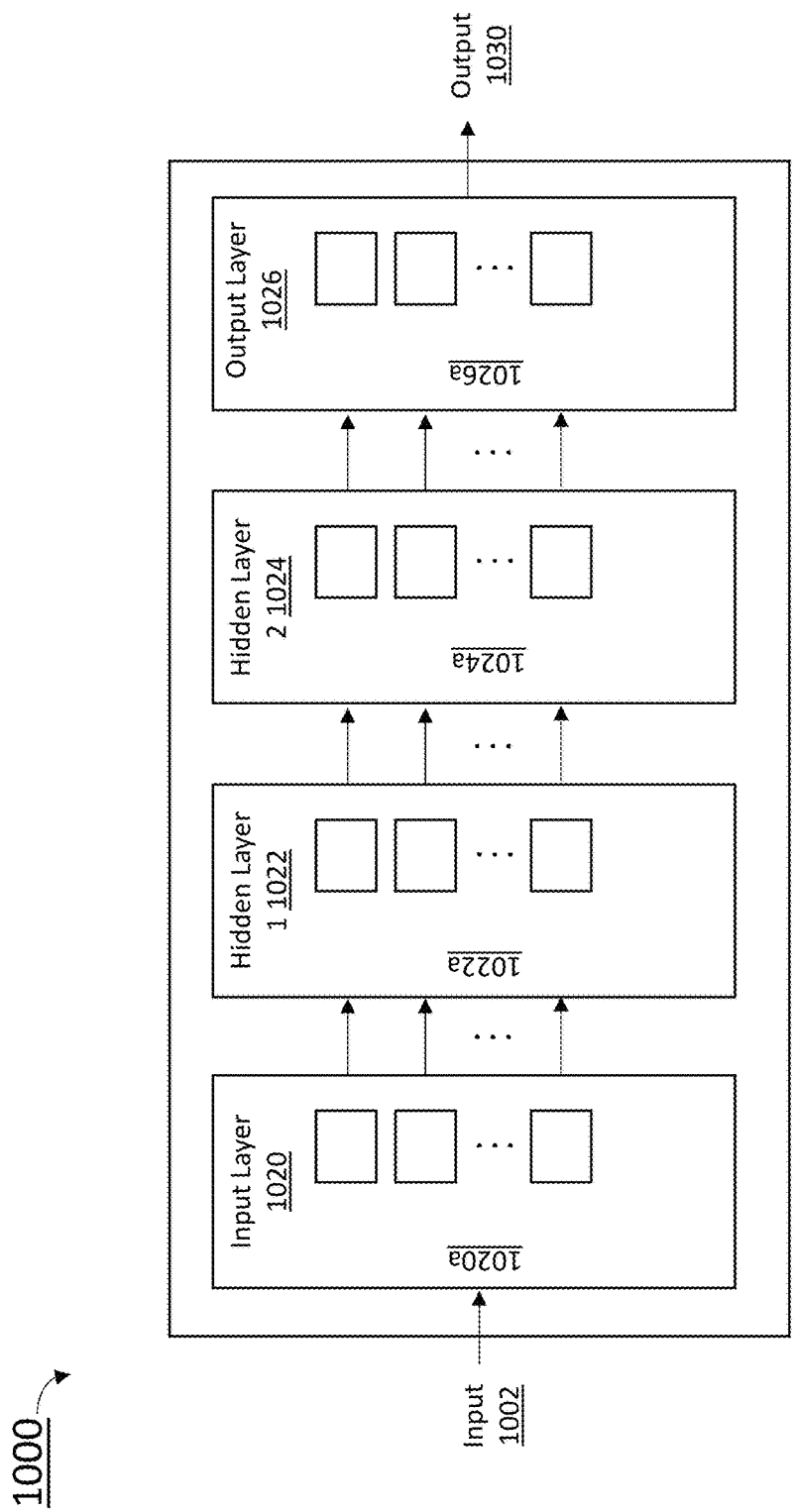
FIG. 10 is a block diagram of an example neural network in accordance with some implementations.

In some implementations, the process environment 500 is configured to perform a number of auxiliary segmentation tasks 527, 529, and 531 in support of a primary segmentation task 525, when training a neural network 521 (e.g., a convolutional neural network (CNN) and an example neural network 1000 shown in FIG. 10) for image classification, in order to extract contextual information (e.g., latent embedding vectors) from input images (e.g., input batch output from the online data stream 501 or image data frames from a training data set 503) by the feature extractor 509.

In some implementations, the process environment 500 is configured to perform an ASER method that scores memory data samples according to their ability to preserve latent decision boundaries for previously observed classes while interfering with latent decision boundaries of current classes being learned. In addition, the process environment 500 is configured to improve the memory retrieval and memory update strategy by concatenating retrieved samples with an incoming batch of new images to form a new mini-batch for training the neural network system. In some implementations, the ASER method leverages the SV for both MemoryRetrieval and MemoryUpdate. Although, the neural network 521 using an ASER method may be used for other purposes, the example process environment 500 focuses on image classification because it is a common application where the ASER method may be used.

In some implementations, the neural network 521 is configured to process the newly formed mini-batch 502 in order to perform image recognition in the online data stream 501. In some implementations, the neural network 521 includes a first portion of the neural network 521 that corresponds to hidden layers of the neural network 521, a second portion of the neural network 521 that corresponds to one or more parallel output layers of the neural network 521 that preform auxiliary segmentation tasks 527, 529, and 531, and a third portion of the neural network 521 that corresponds to an output layer of the neural network 521 that performs the primary segmentation task 525. In some implementations, the neural network 521 (e.g., neural network 1000 shown in FIG. 10) includes a first portion of the neural network 521 that generates a set of feature maps from an input image, a second portion of the neural network 521 that performs a number of auxiliary segmentation tasks 527, 529, and 531 in support of the primary segmentation task 525 based on the outputs of the first and second portions of the neural network 521.

In some implementations, the primary segmentation task 525 performs an image identification task through instance segmentation or semantic segmentation on the image data frames provided by the training data set 503 or the input batch output from the online data stream 501. In some implementations, instance segmentation corresponds to detecting and delineating distinct objects that appear in an image. In some implementations, semantic segmentation corresponds to detecting and labeling objects that appear in an image. In some implementations, the result of the primary segmentation task 525 is labeling whether the image is a cat or a dog. In some implementations, an auxiliary segmentation task 527 may determine whether the image is an airplane or a vehicle.

In some implementations, the memory buffer 505 (e.g., a non-transitory memory) includes a training data set 503. In some implementations, the training data set 503 is provided to train and validate the neural network 521. The training data set 503 includes a set of image data frames and known values for the image data frames. In some implementations, the set of image data frames includes a single image data or two or more image data frames.

In some implementations, an input batch is output from the online data stream 501 at a pre-defined time interval and each input batch correponds to an evaluation set. In some implementations, an input batch is assumed to contain only a small subset of data points in a data stream. For example, if a data stream contains 100 images of cats and dogs, the feature extractor 509 does not have access to all 100 images at once. Instead, the data stream will present an input batch of 10 images at a time. The number of 10 images is arbitrary since it corresponds to a hyper-parameter. For example, most processes normally use 10 images for CIFAR10 and uses 100 images for CIFAR100 datasets. In some implementations, it may be preferred to use a larger batch size for a larger dataset. Since there is no memory buffer, the feature extractor 509 and the training engine 511 does not see any previous images from the input batch output from the online data stream 501.

In some implementations, the feature extractor 509 generates latent embedding vectors from the input batch output from the online data stream 501 by obtaining latent features of an evaluation set and candidate set. The latent embedding vectors are then fed into the training engine 511 for evaluation.

In some implementations, the training engine 511 includes an evaluation unit 513, a computation unit 515, a memory unit 517, and a concatenation unit 519.

In some implementations, the evaluation unit 513 retrieves the latent embedding vectors from the feature extractor 509. In some implementations, there are three different types of evaluation sets-a first type for memory retrieval, a second type for memory retrieval, and a third type for memory update.

In memory retrieval, the evaluation unit 513 sets a first type of evaluation set (e.g., adversarial notion) based on all new images in the input batch, a second type of evaluation set (e.g., cooperative notion) based on a class balanced random subset of data samples, and a candidate set that is evaluated against the first type criteria and the second type criteria from the memory buffer 505.

In memory update, the evaluation unit 513 sets a third type of evaluation set based on the class balanced random subset of data samples and a candidate set composed of new images of the input batch and randomly selected subset of data samples from the memory buffer 505. For example, the evaluation unit 513 sets the 10 new images from the input batch output from the online data stream 501 as evaluation points for determining the KNN-SV score of the 10 new images from the input batch output from the online data stream 501. In some implementations, the evaluation points do not get a KNN-SV score, instead the evaluation points are used for evaluating the KNN-SV of candidate points.

In some implementations, the computation unit 515 determines a K-Nearest Neighbor Shapley value (KNN-SV) of a subset of training samples among the training data set 503 retrieved from the memory buffer 505 or from the input batch output from the online data stream 501. In memory retrieval, the computation unit 515 determines a KNN of candidate points with respect to evaluation for Type 1 and Type 2 using the latent features. In memory update, the computation unit 515 determines the KNN-SV of candidate points with respect to evaluation points using the latent features. Following on the example, for each evaluation point, the computation unit 515 computes the KNN-SV of every other training sample from the training data set 503 that is already in the memory buffer 505. In other words, if there are 100 images in the training data set 503 in the memory buffer 505 then the computation unit 515 computes the KNN-SV of every training point for each new 10 images from the input batch output from the online data stream 501 for the first type of evaluation set (e.g., Type 1) and for a second type of evaluation set (e.g., Type 2). In some implementations, the computation unit 515 takes the average KNN-SV score over all 10 new images from the input batch output from the online data stream 501. In some implementations, the computation unit 515 takes a highest maximum value from the evaluation points. The candidate points obtain their own KNN-SV score after being evaluated against the corresponding evaluation set.

In some implementations, the memory unit 517 samples selections from the training data set 503 that are the most representative samples for updating the memory buffer 505 and also retrieves samples from the training data set 503 from the memory buffer 505 that are both representative samples and adversarial to the new input points.

Specifically, in some implementations, the memory unit 517 retrieves a single set of data samples wherein each data instance of which has a high value for Type 1 or Type 2 criterion or both.

In some implementations, Type 1 evaluation set consists of new images and Type 2 evaluation set is a subset of buffered images. The candidate images that have a high positive KNN-SV score for Type 2 evaluation set correspond to cooperative images that are similar to buffered images. For example, if the training data set 503 has some images of vehicles, a cooperative picture may be a picture containing a common representation of a vehicle. In some implementations, type 2 images have a high positive KNN-SV score with respect to samples in the memory buffer in order to have high ASV or $ASV\mu$. For MemoryUpdate, samples with high KNN-SV promote clustering effect in the latent space.

The candidate images that have a high negative KNN-SV score for Type 1 evaluation set correspond to adversarial images that look similar to new images from the perspective of the learning model, but are a different class. For example, if the evaluation is a dog, then an adversarial picture may be a picture of a wolf that looks similar to a dog. In some implementations, Type 1 images have a high negative KNN-SV score with respect to new images.

In some implementations, in memory update, a single set of data samples is randomly selected from the memory and a replacement occurs when the memory space occupied by one of the selected samples is allocated to any of the new samples in the input batch determined to have a higher average KNN-SV score. In some implementations, the memory unit 517 obtains a sub-sample of the training data set 503 from the memory buffer 505. In some implementations, there are two types of candidate sets each for memory retrieval and memory update. During memory retrieval, those candidate points with the highest ASV or $ASV_\mu$ (e.g., top-N if N data samples are desired for replay) are selected for training the neural network along with the new images. For memory update, those candidate points with a low KNN-SV score are replaced by any of the new images that have a higher KNN-SV score. A greedy choice is made such that high ASV or $ASV_\mu$ and high KNN-SV scores for memory retrieval and updates are favored, respectively.

In some implementations, the concatenation unit 248 concatenates the selected subset of data samples to the input batch of new images to form a new mini-batch 502 for training and updating the parameters of the neural network 521. In some implementations, a single set of data samples are retrieved, each of which has a high value for a Type 1 criterion, a Type 2 criterion, or both. In some implementations, only data samples that have a very high value for either Type 1 or Type 2 criterion are retrieved. Following on the above example, the concatenation unit 248 concatenates 10 images retrieved from the training data set 503 with the highest ASV or $ASV_\mu$ scores for memory retrieval with the 10 new images from the input batch output from the online data stream 501 to form a new mini-batch 502 of 20 images. In some implementations, the new mini-batch 502 is sent back into the neural network 521 for retraining.

As an example, for memory updating, if the input images are cats and dogs then the memory unit 517 will update the memory buffer 505 with images that are most representative of dogs or most representative cats. Following on the example, for memory retrieval, the memory unit 517 retrieves images that either preserve latent decision boundaries for previously observed classes or interfere with latent decision boundaries of current classes being learned or do both. In some implementations, KNN-SV is a proxy for scoring the level of adversarial and cooperative for images.

Although the online data stream 501, the memory buffer 505, the feature extractor 509, the training engine 511, and the neural network 521, are shown as residing on a single device, it should be understood that in other implementations, any combination of the online data stream 501, the memory buffer 505, the training engine 511, and the neural network 521 may be located in separate computing devices.

Moreover, FIG. 5 is intended more as functional description of the various features which may be present in a particular embodiment as opposed to a structural schematic of the implementations described herein. As recognized by those of ordinary skill in the art, items shown separately could be combined and some items could be separated. For example, some functional modules shown separately in FIG. 1 could be implemented in a single module and the various functions of single functional blocks could be implemented by one or more functional blocks in various implementations. The actual number of modules and the division of particular functions and how features are allocated among them will vary from one embodiment to another and, in some implementations, depends in part on the particular combination of hardware, software, and/or firmware chosen for a particular embodiment.

Figure 6:
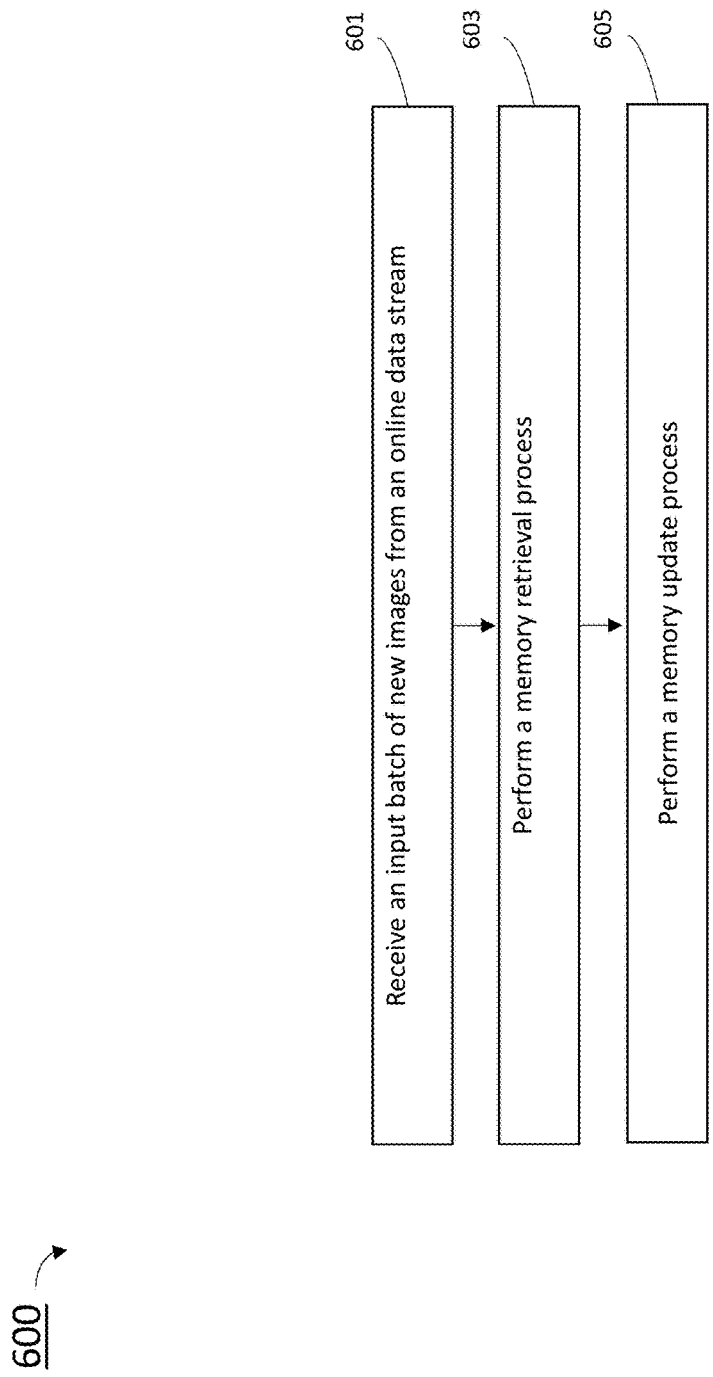
FIG. 6 is a flowchart representation of a ASER method in accordance with some implementations.

FIG. 6 is a flowchart representation of an ASER method 600 in accordance with some implementations. In various implementations, the ASER method 600 is performed by a device (e.g., the AI device 110 shown in FIG. 1) with one or more processors and non-transitory memory that trains the machine learning training system. In some implementations, the ASER method 600 is performed by processing logic, including hardware, firmware, software, or a combination thereof. In some implementations, the ASER method 600 is performed by a processor executing code stored in a non-transitory computer-readable medium (e.g., a memory). At a high level, the ASER method 600 includes: receiving the input batches of the new images from the online data stream, performing a memory retrieval process, and performing a memory update process.

As represented by block 601, the ASER method 600 includes receiving an input batch of new images from an online data stream (e.g., the online data stream 501 shown in FIG. 5). In some implementations, the input batch corresponds to a set of new images samples from the online data stream at a predefined time interval. In some implementations, a subset of the training data samples is retrieved from memory (e.g., the memory buffer 505 shown in FIG. 5) by using the evaluation set and the first candidate set rather than the training data samples.

As represented by block 603, the ASER method 600 includes performing a memory retrieval process. The memory retrieval process generally includes obtaining an evaluation set for Type 1 and Type 2, obtaining a candidate set, obtaining latent features of the evaluation and candidate sets using the feature extractor (e.g., the feature extractor 509 shown in FIG. 5), computing KNN-SV of candidate points with respect to evaluation points for type 1 and type 2 using the latent features using the computation unit (e.g., the computation unit 515 shown in FIG. 5), computing either ASV or $ASV_\mu$, and selecting the top-N candidate points with the highest ASV or $ASV_\mu$ score using the memory unit (e.g., the memory unit 517 shown in FIG. 5), wherein N corresponds to the number of data samples to retrieve from the memory for training.

In memory retrieval, the evaluation set comprises a Type 1 (to leverage an adversarial notion) evaluation set and a Type 2 (to leverage a cooperative notion) evaluation set. Type 1 evaluation set corresponds to all new images in the input batch and the size of the Type 1 evaluation set corresponds to the number of the new images. Type 2 evaluation set corresponds to a class balanced random subset of data samples from the memory (e.g., taking the same number of samples per class by performing uniform random sampling within each class) and the size of the Type 2 evaluation set corresponds to num_per_cls per class. In memory retrieval, the candidate set is evaluated against both Type 1 and Type 2 criteria. The candidate set also corresponds to a class balanced random subset of data samples from the memory (e.g., taking the same number of samples per class by performing uniform random sampling within each class) excluding anything already included in the Type 2 evaluation set). The size of the candidate set corresponds to num_per_cls per class.

In some implementations, performing the memory retrieval process comprises: obtain an evaluation set for a first type of training data and a second type of training data from a first class-balanced random subset of the training data samples from the memory and a first candidate set from a second class-balanced random subset of the training data samples from the memory excluding any training data included in the second type of training data, wherein the evaluation set and the first candidate set comprise different data points, determining a K-Nearest Neighbor Shapley value (KNN-SV) of first candidate points among the first candidate set with respect to evaluation points among the evaluation set and the new images for the first type of training data and the second type of training data, selecting a subset of the first candidate points by aggregating the determined KNN-SVs of the first candidate points, wherein a size of the subset of the first candidate points corresponds to a same size of the received input batch of the new images, and concatenating the selected subset of the first candidate points to the received input batch of new images to form a mini-batch for training the neural network system with the formed mini-batch. In some implementations, the K-Nearest Neighbor Shapley value (KNN-SV) of first candidate points among the first candidate set with respect to evaluation points among the evaluation set and the new images for the first type of training data and the second type of training data are determined by obtaining latent features of the evaluation set and the first candidate set, wherein a sign and a magnitude of the KNN-SV indicates a equivalence in class labels and a relative similarity of a particular candidate point and an particular evaluation point In some implementations, during memory retrieval, the candidate points with the highest ASV or $ASV_\mu$ (e.g., top-N corresponds to selecting N samples for replay) are selected for training the neural network (e.g., the neural network 521 shown in FIG. 5) along with the new images. In some implementations, the KNN-SV is computed in a latent feature space (e.g., use output of the feature extractor 509 shown in FIG. 5 as a representation for each data point in the evaluation and candidate set).

In some implementations, the first class-balanced random subset of the training data samples is balanced in accordance with a number of examples from each class present in the memory. This prevents the ASER method 600 from omitting any latent decision boundaries of classes in the memory.

In some implementations, a size of the evaluation set for the first type of training data corresponds to a size of a number of the new images, wherein a size of the evaluation set for the second type of training data and a size of the first candidate set corresponds to the number of samples per class. In some implementations, the size of the evaluation set is num_per_cls per class. In some implementations, num_per_cls corresponds to the number of data samples per class to be randomly selected from the memory. In some implementations, num_per_cls is used for determining the size of evaluation and candidate sets if they are taken from the memory. For example, if the memory has images of cats and dogs only, then take num_per_cls number of samples belonging to each class such that the total size=num_per_cls*2 classes even if num_cls (e.g., the number of all classes) is larger. In some implementations, num_cls corresponds to the number of classes the online data stream will present to the neural network (e.g., 10 images for CIFAR10, and 100 images for CIFAR100).

In some implementations, the determined KNN-SVs of the first candidate points is aggregated according to an adversarial Shapley Value (ASV) or a mean-variation ($ASV_\mu$), wherein ASV corresponds to a single maximum value with respect to the Type 2 evaluation points minus a single minimum value with respect to the Type 1 evaluation points (i.e., ASV=Max (Type 2)−Min (Type 1)) and the ASV corresponds to an average value with respect to the Type 2 evaluation points minus an average value with respect to the Type 1 evaluation points (i.e., ASVμ=Average (Type 2)−Average (Type 1)). In other words, the ASER method 600 takes the average or the single maximum value over evaluation points. The resulting number is the aggregated KNN-SV of a candidate point. Then, the ASER method 600 compares the aggregated KNN-SV among candidate points, and selects the ones with the highest score.

In some implementations, the first type of training data samples correspond to a first group of data samples among the subset of the training data samples with a negative average KNN-SV of large magnitude with respect to Type 1 evaluation set and the second type of training data samples correspond to a second group of data samples among the subset of the training data samples with a positive average KNN-SV of large magnitude with respect to Type 2 evaluation set. In some implementations, the second type of training data samples correspond to cooperative data points that are representative of training data samples in the memory to retain latent decision boundaries for previously observed classes and the first type of training data samples correspond to adversarial data points that are near samples in the input batch and with different labels to differentiate current classes from previously seen classes, wherein the adversarial data points are adversarial to the new images from the online data stream.

As represented by block 605, the ASER method 600 includes performing a memory update process. The memory update process generally includes obtaining an evaluation set, obtaining a candidate set where the candidate set size corresponds to the number of new images in the input batch in addition to the number of size of the randomly selected data samples from the memory, obtaining latent features of the evaluation and candidate sets using the feature extractor, determining KNN-SV of candidate points with respect to evaluation points using the latent features, sorting KNN-SV of candidate points using the memory unit, storing the top-N candidate points with the highest KNN-SV score in the memory using the memory unit, and discarding the rest using the memory unit. In the memory update, the evaluation set corresponds to a class balanced random subset of training data samples from the memory (e.g., taking the same number of samples per class by performing a uniform random sampling within each class). The size of the evaluation set corresponds to num_per_cls per class. In the memory update, the candidate set corresponds to new images from the input batch in addition with randomly selected subset of data samples from the memory through simple random sampling (e.g., uniform random sampling such that every data point in the memory has a same probability for selection). The size of the candidate set corresponds to a size of the input batch (e.g., number of new images) in addition to num_per_cls*num_cls.

In some implementations, performing the memory update process comprises: obtaining an evaluation set for a third type of training data from the first class-balanced random subset of the training data samples from the memory and a second candidate set from a randomly selected subset of the training data samples from the memory and the new images from the input batch, wherein a size of the second candidate set corresponds to a number of the new images in addition to a number of a size of the randomly selected training data samples from the memory, determining a KNN-SV of second candidate points among the second candidate set with respect to the evaluation points by obtaining latent features of the third type of training data from the evaluation set and the second candidate set, determining a mean of the determined KNN-SVs of the second candidate points across the evaluation points, and replacing the second candidate points that are the training data samples in the memory having a smaller average KNN-SV than the training data samples from the input batch determined to have a higher average KNN-SV.

In some implementations, the evaluation points are used for evaluating KNN-SV of candidate points. In some implementations, the evaluation points do not get their own KNN-SV score. As mentioned above, there are three types of evaluation sets-two for memory retrieval (each for Type 1 and Type 2 criteria) and one for memory update.

In some implementations, the candidate points get their own KNN-SV score after being evaluated against the corresponding evaluation set. In some implementations, there are two types of candidate sets-one type for memory retrieval and one type for memory update. In some implementations. For memory update, the candidate points with a low KNN-SV score are replaced by any of the new images that have a higher KNN-SV score. As long as a new image has a higher KNN-SV than a buffered image, the new image replaces the buffered image in the memory.

In some implementations, the randomly selected subset of the training data samples from the memory along with the new images is set based on uniform random sampling.

In order to show the efficacy of ASER and $ASER_\mu$, their performances are evaluated by comparing them with several state-of-the-art CL baselines for Mini-ImageNet, CIFAR-100, and CIFAR-10. The following section describes the benchmark datasets, the baselines that ASER and $ASER_\mu$ are compared against, and then the experiment setting.

The benchmark datasets comprise Split mini-ImageNet, Split CIFAR-100, and Split CIFAR-10.

Split mini-ImageNet consists of splitting the miniImageNet dataset into 10 disjoint tasks, where each task contains 10 classes. The mini-ImageNet dataset was proposed for few-shot learning evaluation. Its complexity is high due to the use of ImageNet images, but requires fewer resources and infrastructure than running on the full ImageNet dataset. The miniImageNet dataset contains 100 classes randomly chosen from ImageNet ILSVRC-2012 challenge with 600 84×84 color images per class. These 100 classes are divided into 64 base classes, 16 validation, and 20 novel classes respectively for sampling tasks for meta-training, meta-validation, and meta-test.

Split CIFAR-10 splits the CIFAR-10 dataset into 5 different tasks with non-overlapping classes and 2 classes in each task. The CIFAR-10 dataset is a well-known dataset that consists of a collection of images that are commonly used to train machine learning and computer vision algorithms. Specifically, the CIFAR-10 dataset contains 60,000 32×32 color images in 10 different classes that represent airplanes, cars, birds, cats, deer, dogs, frogs, horses, ships, and trucks—with 6000 images per class. There are 50,00 training images and 10,000 test images. The dataset is divided into five training batches and one test batch, each with 10,000 images. The test batch contains exactly 1000 randomly selected-images from each class. The training batches contain the remaining images in random order, but some training batches may contain more images from one class than another. Between them, the training batches contain exactly 5,000 images from each class. The CIFAR-10 database can be used to teach a computer how to recognize objects. CIFAR-10 is particularly well suited to allow researchers to quickly try different algorithms to see what works because the images in CIFAR-10 are low-resolution (32×32).

Split CIFAR-100 is constructed by splitting the CIFAR-100 dataset into 10 disjoint tasks, where each task has 10 classes. The CIFAR-100 dataset is just like the CIFAR-10 dataset, except it has 100 classes containing 600 images each. There are 500 training images and 100 testing images per class. The 100 classes in the CIFAR-100 are grouped into 20 superclasses. Each image comes with a "fine" label (the class to which it belongs) and a "course" label (the superclass to which it belongs).

ASER and $ASER_\mu$, are then evaluated by comparing them with several state-of-the-art CL baselines including iid online, iid offline, Average Gradient Episodic Memory (AGEM), experience replay (ER), Elastic Weight Consolidation (EWC), fine-tune, Gradient-Based Sample Selection (GSS), and Maximally Interfered Retrieval (MIR).

As already described above, ASER scores samples in the memory with ASV in Equation 5 shown in paragraph 97 and ASERu uses the mean variation ASVu in Equation 6 shown in paragraph 97.

Iid-online trains the model with a single-pass through the same set of data, but each mini-batch is sampled iid from the training set. Iid-offline trains the model over multiple epochs on the dataset with iid sampled mini-batch. 5 epochs for iid-offline were used.

AGEM is a memory-based method that utilizes the samples in the memory buffer to constrain the parameter updates. ER is a recent and successful rehearsal method with random sampling in MemoryRetrieval and reservoir sampling in MemoryUpdate. Elastic Weight Consolidation (EWC) is a prior-focused method that limits the update of parameters that were important to the past tasks, as measured by the Fisher information matrix. Fine-tune is an important baseline that simply trains the model in the order the data is presented without any specific method for forgetting avoidance. GSS is a MemoryUpdate method that diversifies the gradients of the samples in the replay memory. MIR is a MemoryRetrieval method that retrieves memory samples that suffer from an increase in loss given the estimated parameters update based on the current task.

The experiment setting consists of a single-head evaluation and a reduced ResNet18 model as the basemodel for all datasets.

Most of the previous works in CL applied multi-head evaluation where a distinct output head is assigned for each task and the model utilizes the task identity to choose the corresponding output head during test time. However, in many realistic scenarios, task identity is not available during test time so the model should be able to classify labels from different tasks. The experiment adopted a single-head evaluation setup where the model has one output head is adopted for all tasks and is required to classify all labels.

A reduced ResNet18 was used as the basemodel for all datasets, and the network is trained via cross-entropy loss with SGD optimizer and mini-batch size of 10. The size of the mini-batch retrieved from memory is also set to 10 irrespective of the size of the memory.

Figure 7:
FIG. 7 is a table illustrating an accuracy comparison between Mini-ImageNet, CIFAR-100, and CIFAR-10 in accordance with some implementations.
Figure 8:
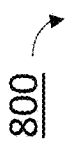
FIG. 8 is a table illustrating an average forgetting comparison between Mini-ImageNet, CIFAR-100, and CIFAR-10 in accordance with some implementations.

FIGS. 7 and 8 show the average accuracy (table 700 in FIG. 7) and average forgetting (table 800 in FIG. 8) by the end of the data stream for Mini-ImageNet, CIFAR-100, and CIFAR-10 in accordance with some implementations.

In FIG. 7, a higher value is better and M is the memory buffer size. All numbers are the average of 15 runs. As shown in FIG. 7, $ASER_\mu$ shows a better performance when M is small and the dataset is more complex.

Overall, FIGS. 7 and 8 both show that ASER and ASERµ show improved performance in three standard CL datasets. Specifically, ASERµ outperforms all of the state-of-the art baselines by significant margins in a more difficult setting where memory size is small and dataset is complex. since the difficulty of the three datasets is different, comparing the absolute accuracy improvement may not be fair. Therefore, percentage improvement may be more appropriate. Percentage improvement is the ratio between absolute improvement and baseline performance. Taking Mini-ImageNet as an example, ASERµ improves the strongest baseline by 40.2% (M-1k), 25.4% (M-2k) and 10.3% (M-5k) in terms of percentage improvement. For example, in Mini-ImageNet (M=1k), ASERµ improves MIR by (12.8−8.7)/(8.7)=40.2%.

Figure 9:
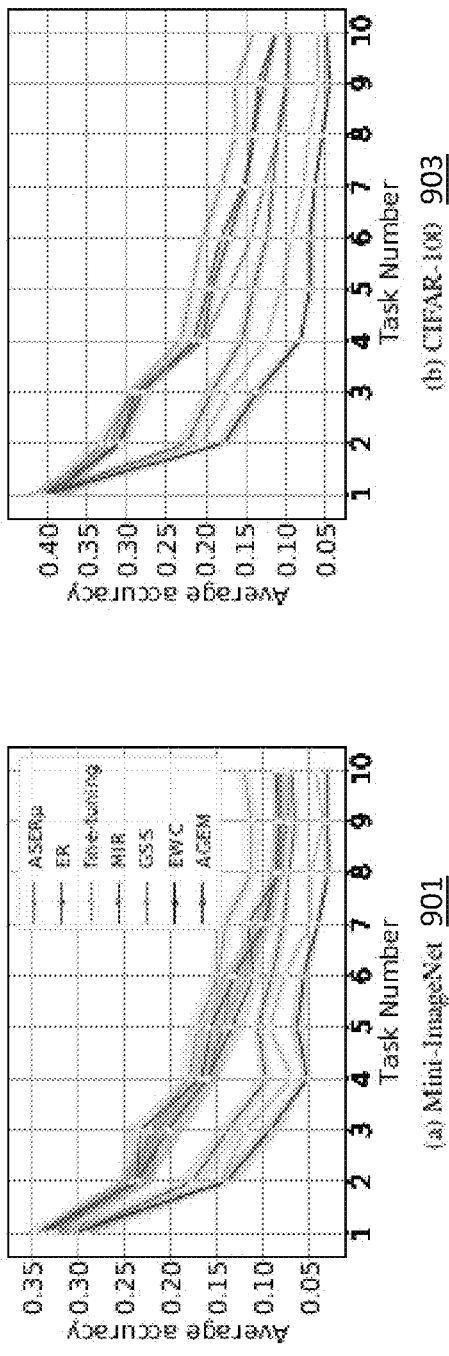
FIG. 9 illustrates average forgetting between Mini-ImageNet and CIFAR-100 in accordance with some implementations.

FIG. 9 illustrates the average accuracy between Mini-ImageNet 901 and CIFAR-100 903 in accordance with some implementations. Specifically, FIG. 9 shows a table 900 depicting the average accuracy on observed tasks when M=1k. The shaded region in the table 900 represents the 95% confidence interval. The table 900 shows that $ASER_\mu$ outperforms other baselines especially when the model sees more classes (each task contains new classes).

As shown in FIG. 9, $ASER_\mu$ is consistently better than any other baselines in both datasets. It is noted that $ASER_\mu$ generally performs better than ASER because if the ASV criterion is used, then there has a higher chance that the value is affected by an outlier point in the evaluation set. Accordingly, $ASV_\mu$ gives a more stable and accurate value in complicated datasets than ASV.

Another interesting observation is that ER has very competitive performances in more complex datasets—ER surpasses GSS and performs similarly as MIR, which proves that ER is a simple but powerful CL baseline. In addition, for complex datasets, when memory size is larger than 500 (10% of the training data), most of the replay-based methods (except for GSS) outperform the iid-online, a baseline that trains the model with a one-pass through data but with iid-sampled mini-batch from the whole dataset. This means that storing a small number of training samples is crucial for combatting forgetting as well as the learning of the current task in the online class-incremental setting.

Also shown in FIG. 9, EWC, a regularization-based method is surpassed by all memory-based methods and also underperforms the fine-tuning baseline. Additionally, AGEM, a method that uses memory samples to constrain parameter updates, delivers worse performance compared with reply-based methods (ER, MIR, and GSS), especially when memory size increases.

FIGS. 7, 9, and 9 show the effectiveness of ASER and its variant $ASER_\mu$ is shown to overcome catastrophic forgetting, especially in more complex datasets and when the memory size is relatively small, based on evaluating ASER and $ASER_\mu$ against the three standard CL datasets and comparing them to the state-of-the art CL methods.

FIG. 10 is a block diagram of an example neural network 1000 according to some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the neural network 1000 includes an input layer 1020, a first hidden layer 1022, a second hidden layer 1024, and an output layer 1026. While the neural network 1000 includes two hidden layers as an example, those of ordinary skill in the art will appreciate from the present disclosure that one or more additional hidden layers are also present in various implementations. Adding additional hidden layers adds to the computational complexity and memory demands but may improve performance for some applications.

In various implementations, the input layer 1020 is coupled (e.g., configured) to receive various inputs 1002 (e.g., image data). For example, the input layer 1020 receives pixel data from one or more image sensors (e.g., the one or more exterior image sensors 214 shown in FIG. 2). In various implementations, the input layer 1020 includes a number of long short-term memory (LSTM) logic units 1020a, which are also referred to as model(s) of neurons by those of ordinary skill in the art. In some such implementations, an input matrix from the features to the LSTM logic units 1020a include rectangular matrices. For example, the size of this matrix is a function of the number of features included in the feature stream.

In some implementations, the first hidden layer 1022 includes a number of LSTM logic units 1022a. In some implementations, the number of LSTM logic units 1022a ranges between approximately 10-500. Those of ordinary skill in the art will appreciate that, in such implementations, the number of LSTM logic units per layer is orders of magnitude smaller than previously known approaches (being of the order of $O(10^1)$ to $O(10^2)$), which allows such implementations to be embedded in highly resource-constrained devices. As illustrated in the example of FIG. 10, the first hidden layer 1022 receives its inputs from the input layer 1020. For example, the first hidden layer 1022 performs one or more of following: a convolutional operation, a nonlinearity operation, a normalization operation, a pooling operation, and/or the like.

In some implementations, the second hidden layer 1024 includes a number of LSTM logic units 1024a. In some implementations, the number of LSTM logic units 1024a is the same as or similar to the number of LSTM logic units 1020a in the input layer 1020 or the number of LSTM logic units 1022a in the first hidden layer 1022. As illustrated in the example of FIG. 10, the second hidden layer 1024 receives its inputs from the first hidden layer 1022. Additionally and/or alternatively, in some implementations, the second hidden layer 1024 receives its inputs from the input layer 1020. For example, the second hidden layer 1024 performs one or more of following: a convolutional operation, a nonlinearity operation, a normalization operation, a pooling operation, and/or the like.

In some implementations, the output layer 1026 includes a number of LSTM logic units 1026a. In some implementations, the number of LSTM logic units 1026a is the same as or similar to the number of LSTM logic units 1020a in the input layer 1020, the number of LSTM logic units 1022a in the first hidden layer 1022, or the number of LSTM logic units 1024a in the second hidden layer 1024. In some implementations, the output layer 1026 is a task-dependent layer that performs a computer vision related task such as feature extraction, object recognition, object detection, pose estimation, or the like. In some implementations, the output layer 1026 includes an implementation of a multinomial logistic function (e.g., a soft-max function) that produces a number of outputs 1030.

Neural networks, such as CNNs are often used to solve computer vision problems including feature extraction, object recognition, object detection, and pose estimation. A modern CNN is typically described as having an input layer, a number of hidden layers, and an output layer. In at least some scenarios, the input to the input layer of the CNN is an image frame while the output layer is a task-dependent layer. The hidden layers often include one of a plurality of operations such as convolutional, nonlinearity, normalization, and pooling operations. For example, a respective convolutional layer may include a set of filters whose weights are learned directly from data. Continuing with this example, the output of these filters are one or more feature maps that are obtained by applying filters to the input data of the convolutional layer.

Implementations according to the present disclosure described above may be implemented in the form of computer programs that may be executed through various components on a computer, and such computer programs may be recorded in a computer-readable medium. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

Meanwhile, the computer programs may be those specially designed and constructed for the purposes of the present disclosure or they may be of the kind well known and available to those skilled in the computer software arts.

Examples of program code include both machine codes, such as produced by a compiler, and higher level code that may be executed by the computer using an interpreter.

As used in the present disclosure (especially in the appended claims), the singular forms "a," "an," and "the" include both singular and plural references, unless the context clearly states otherwise. Also, it should be understood that any numerical range recited herein is intended to include all sub-ranges subsumed therein (unless expressly indicated otherwise) and accordingly, the disclosed numeral ranges include every individual value between the minimum and maximum values of the numeral ranges.

Operations constituting the method of the present disclosure may be performed in appropriate order unless explicitly described in terms of order or described to the contrary. The present disclosure is not necessarily limited to the order of operations given in the description. All examples described herein or the terms indicative thereof ("for example," etc.) used herein are merely to describe the present disclosure in greater detail. Therefore, it should be understood that the scope of the present disclosure is not limited to the example implementations described above or by the use of such terms unless limited by the appended claims. Therefore, it should be understood that the scope of the present disclosure is not limited to the example implementations described above or by the use of such terms unless limited by the appended claims. Also, it should be apparent to those skilled in the art that various alterations, substitutions, and modifications may be made within the scope of the appended claims or equivalents thereof.

Therefore, technical ideas of the present disclosure are not limited to the above-mentioned implementations, and it is intended that not only the appended claims, but also all changes equivalent to claims, should be considered to fall within the scope of the present disclosure.

What is claimed is:

1. A method for reducing a degree of catastrophic forgetting in a neural network by scoring training data samples according to an ability to preserve latent decision boundaries for previously observed classes while promoting learning from an input batch of new images from an online data stream, the method comprising:
receiving the input batch of the new images from the online data stream;
performing, with respect to a memory, a memory retrieval process comprising:
obtaining an evaluation set for a first type of training data and a second type of training data from a first class-balanced random subset of the training data samples from the memory and a first candidate set from a second class-balanced random subset of the training data samples from the memory excluding any training data included in the second type of training data, wherein the evaluation set and the first candidate set comprise different data points, wherein the second type of training data corresponds to cooperative data points that are representative of training data samples in the memory to retain latent decision boundaries for previously observed classes, wherein the first type of training data corresponds to adversarial data points that are near samples in the input batch and with different labels to differentiate current classes from previously seen classes, and wherein the adversarial data points are adversarial to the new images from the online data stream;
determining a K-Nearest Neighbor Shapley value (KNN-SV) of first candidate points among the first candidate set with respect to evaluation points among the evaluation set and the new images for the first type of training data and the second type of training data;
selecting a subset of the first candidate points for memory replay to reduce the degree of catastrophic forgetting, by aggregating the determined KNN-SVs of the first candidate points, wherein a size of the subset of the first candidate points corresponds to a same size of the received input batch of the new images;
concatenating the subset of the first candidate points selected for memory replay to the received input batch of new images to form a mini-batch for training the neural network with the formed mini-batch; and
training the neural network to perform image recognition based on the formed mini-batch; and
performing, with respect to the memory, a memory update process comprising:
obtaining an evaluation set for a third type of training data from the first class-balanced random subset of the training data samples from the memory and a second candidate set from a randomly selected subset of the training data samples from the memory and the new images from the input batch, wherein a size of the second candidate set corresponds to a number of the new images in addition to a number of a size of the randomly selected training data samples from the memory;
determining a KNN-SV of second candidate points among the second candidate set with respect to evaluation points among the evaluation set for the third type of training data by obtaining latent features of the third type of training data from the evaluation set and the second candidate set;
determining a mean of the determined KNN-SVs of the second candidate points across the evaluation points; and
replacing the second candidate points that are the training data samples in the memory having a smaller average KNN-SV than the training data samples from the input batch determined to have a higher average KNN-SV.

2. The method of claim 1, wherein the input batch corresponds to a set of new images sampled from the online data stream at a predefined time interval.

3. The method of claim 1, wherein the subset of the training data samples retrieved from memory uses the evaluation set and the first candidate set rather than the training data samples.

4. The method of claim 1, wherein the K-Nearest Neighbor Shapley value (KNN-SV) of first candidate points among the first candidate set with respect to the evaluation points among the evaluation set and the new images for the first type of training data and the second type of training data are determined by obtaining latent features of the evaluation set and the first candidate set, wherein a sign and a magnitude of the KNN-SV indicates an equivalence in class labels and a relative similarity of a particular candidate point and an particular evaluation point.

5. The method of claim 1, wherein the first class-balanced random subset of the training data samples is balanced in accordance with a number of examples from each class present in the memory.

6. The method of claim 1, wherein a size of the evaluation set for the first type of training data corresponds to a size of a number of the new images, wherein a size of the evaluation set for the second type of training data and a size of the first candidate set corresponds to a number of samples per class.

7. The method of claim 1, wherein the determined KNN-SVs of the first candidate points is aggregated according to an adversarial Shapley Value (ASV) or a mean-variation (ASVμ), wherein the ASV corresponds to a single maximum value with respect to Type 2 evaluation points minus a single minimum value with respect to Type 1 evaluation points and the ASVμ corresponds to an average value with respect to the Type 2 evaluation points minus an average value with respect to the Type 1 evaluation points.

8. The method of claim 1, wherein the first type of training data corresponds to a first group of data samples among the subset of the training data samples with a negative average KNN-SV of a large magnitude with respect to Type 1 evaluation set and the second type of training data corresponds to a second group of data samples among the subset of the training data samples with a positive average KNN-SV of a large magnitude with respect to Type 2 evaluation set.

9. The method of claim 1, wherein the randomly selected subset of the training data samples from the memory along with the new images is set based on a uniform random sampling.

10. A neural network system comprising:
one or more processors; and
a non-transitory memory storing instructions for reducing a degree of catastrophic forgetting in a neural network by scoring training data samples according to an ability to preserve latent decision boundaries for previously observed classes while promoting learning from an input batch of new images from an online data stream, wherein the instructions, when executed by the one or more processors, cause the one or more processors to perform:
receiving the input batch of the new images from the online data stream;
   obtaining an evaluation set for a first type of training data and a second type of training data from a first class-balanced random subset of the training data samples from the memory and a first candidate set from a second class-balanced random subset of the training data samples from the memory excluding any training data included in the second type of training data, wherein the evaluation set and the first candidate set comprise different data points,
   wherein the second type of training data corresponds to cooperative data points that are representative of training data samples in the memory to retain latent decision boundaries for previously observed classes,
   wherein the first type of training data corresponds to adversarial data points that are near samples in the input batch and with different labels to differentiate current classes from previously seen classes, and
   wherein the adversarial data points are adversarial to the new images from the online data stream;
   determining a K-Nearest Neighbor Shapley value (KNN-SV) of first candidate points among the first candidate set with respect to evaluation points among the evaluation set and the new images for the first type of training data and the second type of training data;
   selecting a subset of the first candidate points for memory replay to reduce the degree of catastrophic forgetting, by aggregating the determined KNN-SVs of the first candidate points, wherein a size of the subset of the first candidate points corresponds to a same size of the received input batch of the new images;
   concatenating the subset of the first candidate points selected for memory replay to the received input batch of new images to form a mini-batch for training the neural network with the formed mini-batch; and
   training the neural network to perform image recognition based on the formed mini-batch; and
a memory update process comprising:
   obtaining an evaluation set for a third type of training data from the first class-balanced random subset of the training data samples from the memory and a second candidate set from a randomly selected subset of the training data samples from the memory and the new images from the input batch, wherein a size of the second candidate set corresponds to a number of the new images in addition to a number of a size of the randomly selected training data samples from the memory;
   determining a KNN-SV of second candidate points among the second candidate set with respect to the evaluation points by obtaining latent features of the third type of training data from the evaluation set and the second candidate set;
   determining a mean of the determined KNN-SVs of the second candidate points across the evaluation points; and
   replacing the second candidate points that are the training data samples in the memory having a smaller average KNN-SV than the training data samples from the input batch determined to have a higher average KNN-SV.

11. The neural network system of claim 10, wherein the input batch corresponds to a set of new images sampled from the online data stream at a predefined time interval.

12. The neural network system of claim 10, wherein the subset of the training data samples retrieved from memory uses the evaluation set and the first candidate set rather than the training data samples.

13. The neural network system of claim 10, wherein the K-Nearest Neighbor Shapley value (KNN-SV) of first candidate points among the first candidate set with respect to evaluation points among the evaluation set and the new images for the first type of training data and the second type of training data are determined by obtaining latent features of the evaluation set and the first candidate set, wherein a sign and a magnitude of the KNN-SV indicates an equivalence in class labels and a relative similarity of a particular candidate point and an particular evaluation point.

14. The neural network system of claim 10, wherein the first class-balanced random subset of the training data samples is balanced in accordance with a number of examples from each class present in the memory.

15. A non-transitory memory storing one or more programs, which, when executed by one or more processors of a device, cause the device to be configured to perform:
receiving an input batch of new images from an online data stream;
performing a memory retrieval process comprising:
   obtaining an evaluation set for a first type of training data and a second type of training data from a first class-balanced random subset of training data samples from the memory and a first candidate set from a second class-balanced random subset of the training data samples from the memory excluding any training data included in the second type of training data, wherein the evaluation set and the first candidate set comprise different data points, wherein the second type of training data corresponds to cooperative data points that are representative of training data samples in the memory to retain latent decision boundaries for previously observed classes, wherein the first type of training data corresponds to adversarial data points that are near samples in the input batch and with different labels to differentiate current classes from previously seen classes, and wherein the adversarial data points are adversarial to the new images from the online data stream;

determining a K-Nearest Neighbor Shapley value (KNN-SV) of first candidate points among the first candidate set with respect to evaluation points among the evaluation set and the new images for the first type of training data and the second type of training data;

selecting a subset of the first candidate points for memory replay to reduce a degree of catastrophic forgetting in a neural network, by aggregating the determined KNN-SVs of the first candidate points, wherein a size of the subset of the first candidate points corresponds to a same size of the received input batch of the new images;

concatenating the subset of the first candidate points selected for memory replay to the received input batch of new images to form a mini-batch for training the neural network with the formed mini-batch; and training the neural network to perform image recognition based on the formed mini-batch; and performing a memory update process comprising:
obtaining an evaluation set for a third type of training data from the first class-balanced random subset of the training data samples from the memory and a second candidate set from a randomly selected subset of the training data samples from the memory and the new images from the input batch, wherein a size of the second candidate set corresponds to a number of the new images in addition to a number of a size of the randomly selected training data samples from the memory;

determining a KNN-SV of second candidate points among the second candidate set with respect to the evaluation points by obtaining latent features of the third type of training data from the evaluation set and the second candidate set;

determining a mean of the determined KNN-SVs of the second candidate points across the evaluation points; and replacing the second candidate points that are the training data samples in the memory having a smaller average KNN-SV than the training data samples from the input batch determined to have a higher average KNN-SV.

16. The non-transitory memory of claim 15, wherein the input batch corresponds to a set of new images sampled from the online data stream at a predefined time interval.

17. The non-transitory memory of claim 15, wherein the subset of the training data samples retrieved from memory uses the evaluation set and the first candidate set rather than the training data samples.

18. The non-transitory memory of claim 15, wherein the K-Nearest Neighbor Shapley value (KNN-SV) of first candidate points among the first candidate set with respect to evaluation points among the evaluation set and the new images for the first type of training data and the second type of training data are determined by obtaining latent features of the evaluation set and the first candidate set, wherein a sign and a magnitude of the KNN-SV indicates an equivalence in class labels and a relative similarity of a particular candidate point and an particular evaluation point.

19. The non-transitory memory of claim 15, wherein the first class-balanced random subset of the training data samples is balanced in accordance with a number of examples from each class present in the memory.

* * * * *